(12) United States Patent
Nanaumi

(10) Patent No.: US 9,019,281 B2
(45) Date of Patent: Apr. 28, 2015

(54) MOBILE TERMINAL, SETTING METHOD, AND STORAGE MEDIUM

(75) Inventor: Yoshihito Nanaumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 13/527,323

(22) Filed: Jun. 19, 2012

(65) Prior Publication Data

US 2013/0009967 A1    Jan. 10, 2013

(30) Foreign Application Priority Data

Jul. 4, 2011   (JP) .................................. 2011-148678

(51) Int. Cl.
*G06T 1/00* (2006.01)
*G06F 17/30* (2006.01)
*G06Q 10/10* (2012.01)

(52) U.S. Cl.
CPC ............ *G06T 1/00* (2013.01); *G06F 17/30896* (2013.01); *G06F 17/30011* (2013.01); *G06Q 10/10* (2013.01); *Y10S 707/99951* (2013.01)

(58) Field of Classification Search
USPC .......................... 345/501; 709/203; 707/999.2
See application file for complete search history.

(56) References Cited

U.S. PATENT DOCUMENTS

| | | | |
|---|---|---|---|
| 2005/0289164 A1* | 12/2005 | Yoon ............................. | 707/100 |
| 2008/0228732 A1* | 9/2008 | Morisawa ......................... | 707/3 |
| 2011/0173538 A1* | 7/2011 | Robert et al. .................. | 715/720 |
| 2011/0225493 A1* | 9/2011 | Uchida et al. ................. | 715/704 |

FOREIGN PATENT DOCUMENTS

| | | |
|---|---|---|
| CN | 1674618 A | 9/2005 |
| CN | 101116254 A | 1/2008 |
| CN | 101118532 A | 2/2008 |
| CN | 101320368 A | 12/2008 |
| JP | 2004-102935 A | 4/2004 |
| JP | 2006-140812 A | 6/2006 |
| JP | 2006-215829 A | 8/2006 |
| JP | 2006-330819 A | 12/2006 |
| JP | 2009-516423 A | 4/2009 |

\* cited by examiner

*Primary Examiner* — Maurice L McDowell, Jr.
(74) *Attorney, Agent, or Firm* — Canon USA, Inc., IP Division

(57) ABSTRACT

A mobile terminal including a display unit and communicably connected to a storage apparatus storing setting information of a user interface for an information processing terminal for receiving a user operation to data in the information processing terminal. The mobile terminal includes an acquisition unit and a control unit. The acquisition unit acquires the setting information from the storage apparatus. The control unit displays a user interface for the mobile terminal using the setting information on the display unit.

6 Claims, 20 Drawing Sheets

FIG.7A

| UserID | UserName |
|---|---|
| 1 | UserA |
| 2 | UserB |

FIG.7B

| Lib_ID | UserID | Library URL | DeviceKind | Order | DisableMobile |
|---|---|---|---|---|---|
| 1 | 1 | http://Server/Sites/Library | PC | 1 | |
| 2 | 2 | http://Server2/Sites/Library | Mobile | 1 | 1 |

FIG.7C

| Notify_ID | Lib_ID | NotifyFolder | DeviceKind | Order | DisableMobile |
|---|---|---|---|---|---|
| 1 | 1 | XXX/YYY | PC | 1 | 1 |
| 2 | 2 | CCC/DDD | Mobile | 1 | |
| 3 | 1 | NNN/MMM | PC | 2 | 1 |
| 4 | 2 | NNN/MMM | PC | 3 | |
| 5 | 1 | NNN/ZZZ | PC | 4 | |

FIG.7D

| Dest_ID | Lib_ID | DestinationFolder | DeviceKind | Order | DisableMobile |
|---|---|---|---|---|---|
| 1 | 1 | XXX/hoge1 | PC | 1 | 1 |
| 2 | 1 | XXX/hoge2 | Mobile | 1 | |
| 3 | 1 | XXX/hoge3 | PC | 2 | 1 |

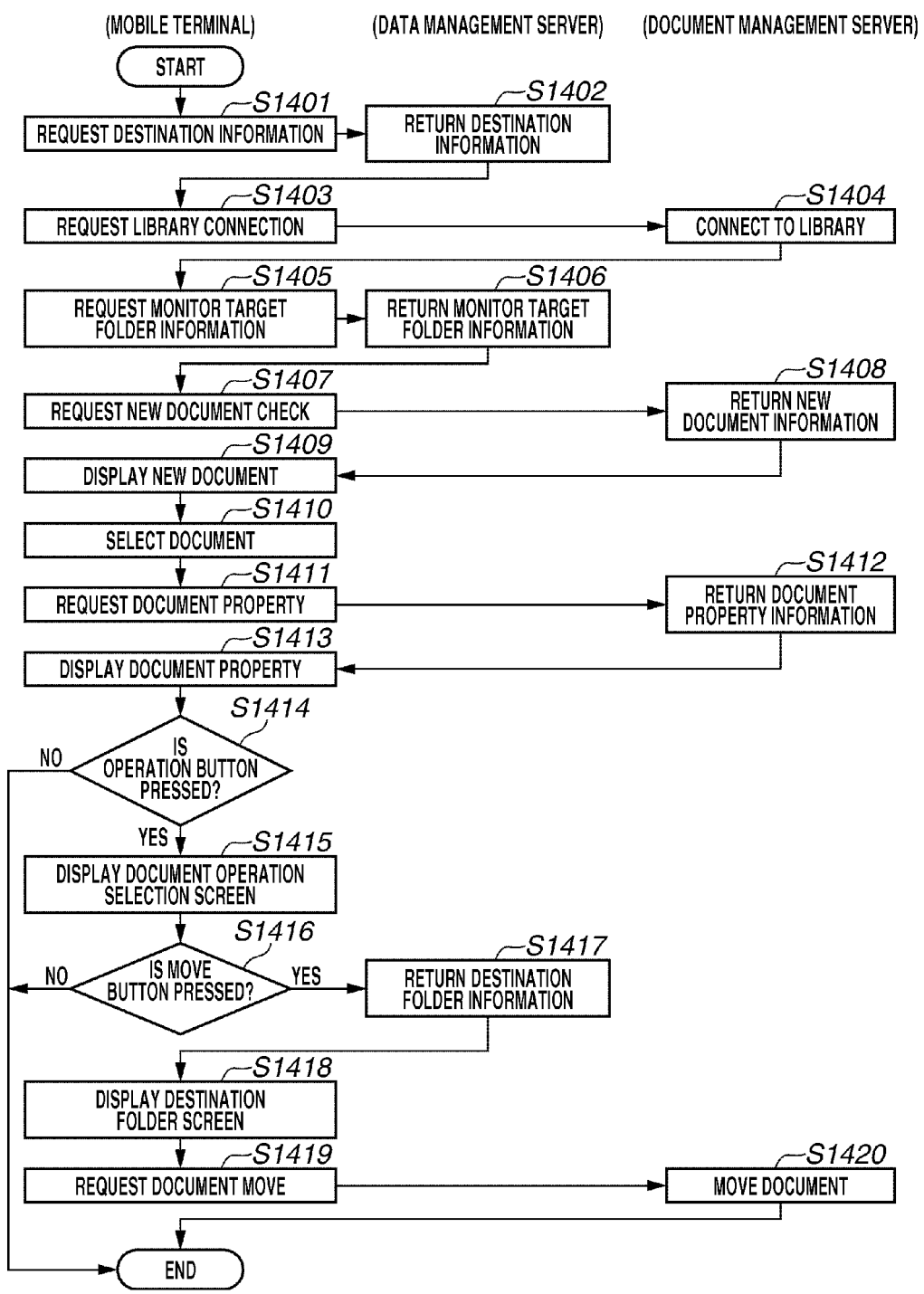

FIG.16A

| Opehistory_ID (1601) | Notify_ID (1602) | OperationHistory (1603) |
|---|---|---|
| 1 | 1 | Move |
| 2 | 2 | Edit Property |
| 3 | 1 | Approval |
| 4 | 1 | Move |
| 5 | 1 | Print |

FIG.16B

| Desthistory_ID (1611) | Notify_ID (1612) | DestinationHistory (1613) |
|---|---|---|
| 1 | 1 | XXX/UserA |
| 2 | 2 | XXX/UserB |
| 3 | 1 | XXX/UserB |
| 4 | 1 | XXX/UserA |
| 5 | 1 | XXX/UserA |

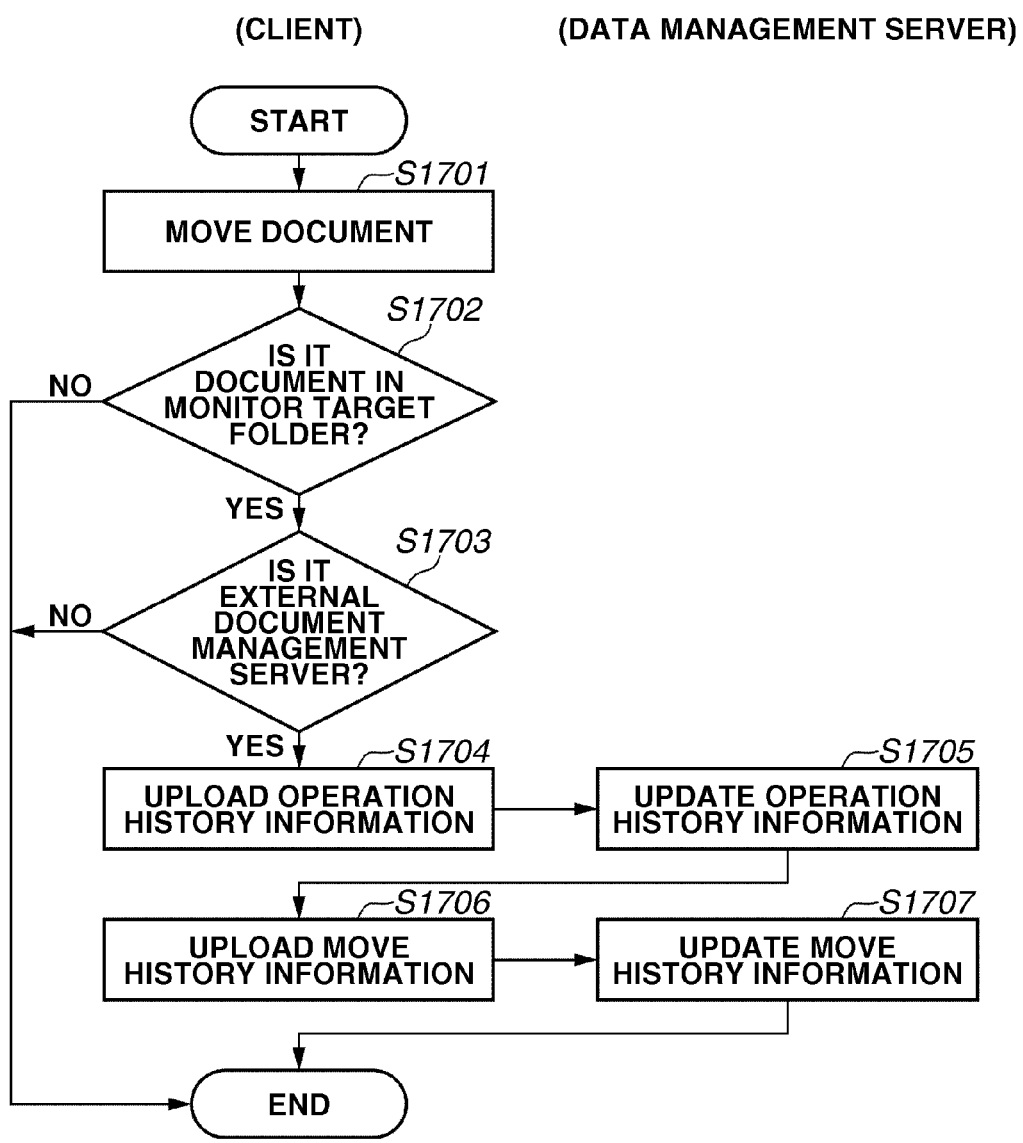

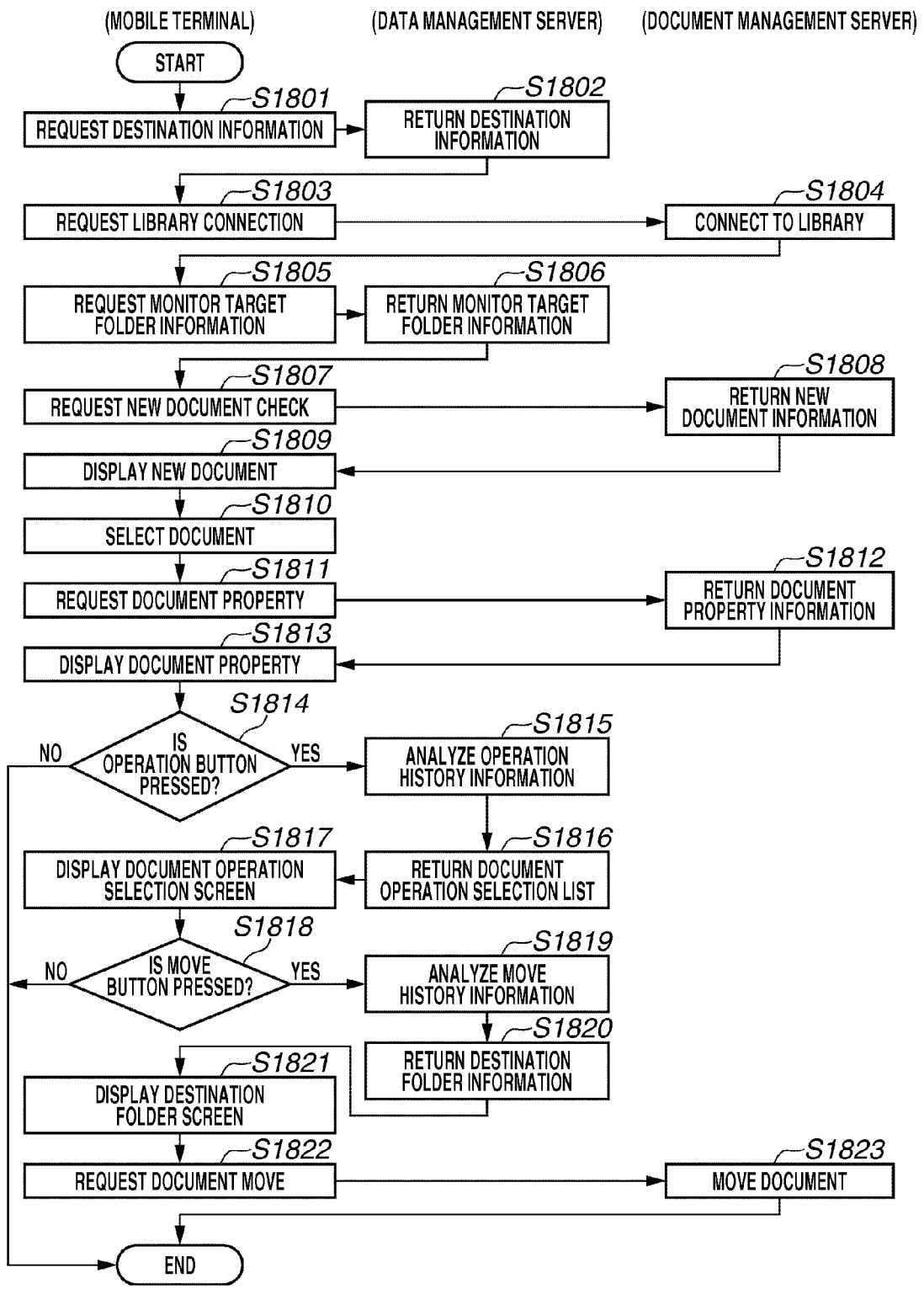

MOBILE TERMINAL, SETTING METHOD, AND STORAGE MEDIUM

BACKGROUND OF THE INVENTION

1. Field of the Invention

The present invention relates to a mobile terminal, a setting method, and a storage medium.

2. Description of the Related Art

There have been known configurations for providing services from a server to a client. For example, techniques for transmitting a document from a client to a server, and managing the document in the server are provided.

In these days, to reduce the costs for managing and maintaining servers provided in companies and applications operating on the servers, cloud computing systems are attracting attention. In the cloud computing systems, various kinds of applications operating on servers on the Internet can be used. Especially, Google Inc. and Microsoft Corporation are vendors attracting the most attention. These vendors have established many large-scale data centers, and their business activities are aggressive.

Meanwhile, mobile terminals represented by iPhone (registered trademark) and cellular phones with Android as an operating system (registered trademark) are now receiving attention. For the mobile terminals, a configuration for managing data for a user in a mobile terminal using a remote database in a network is discussed in Japanese Patent Application Laid-Open (Translation of Patent Cooperation Treaty (PCT) Application) No. 2009-516423.

However, setting of various user interfaces on a mobile terminal is difficult because its display area and operation area are small. Especially, entry of character strings relating to setting on the mobile terminal is troublesome. The difficulty in the setting of user interfaces on the mobile terminal is to be solved.

SUMMARY OF THE INVENTION

The present invention is directed to a mobile terminal and a setting method capable of using user interfaces more easily.

According to an aspect of the present invention, a mobile terminal including a display unit and configured to be communicably connected to a storage apparatus storing setting information of a user interface for an information processing terminal for receiving a user operation to data in the information processing terminal. The mobile terminal includes an acquisition unit configured to acquire the setting information from the storage apparatus, and a control unit configured to display a user interface for the mobile terminal using the setting information on the display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

FIGS. 7A, 7B, 7C, and 7D illustrate example tables.

FIG. 14 illustrates an example flowchart of mobile processing.

FIGS. 16A and 16B illustrate example tables.

FIG. 17 is an example flowchart of document move processing.

FIG. 18 is an example flowchart of mobile processing.

DESCRIPTION OF THE EMBODIMENTS

Various exemplary embodiments, features, and aspects of the invention will be described in detail below with reference to the drawings.

It should be understood that the exemplary embodiments are not to be construed as limiting the present invention. All configurations described in the exemplary embodiments are not always necessary to solve the problems to be solved by the present invention.

Figure 1:
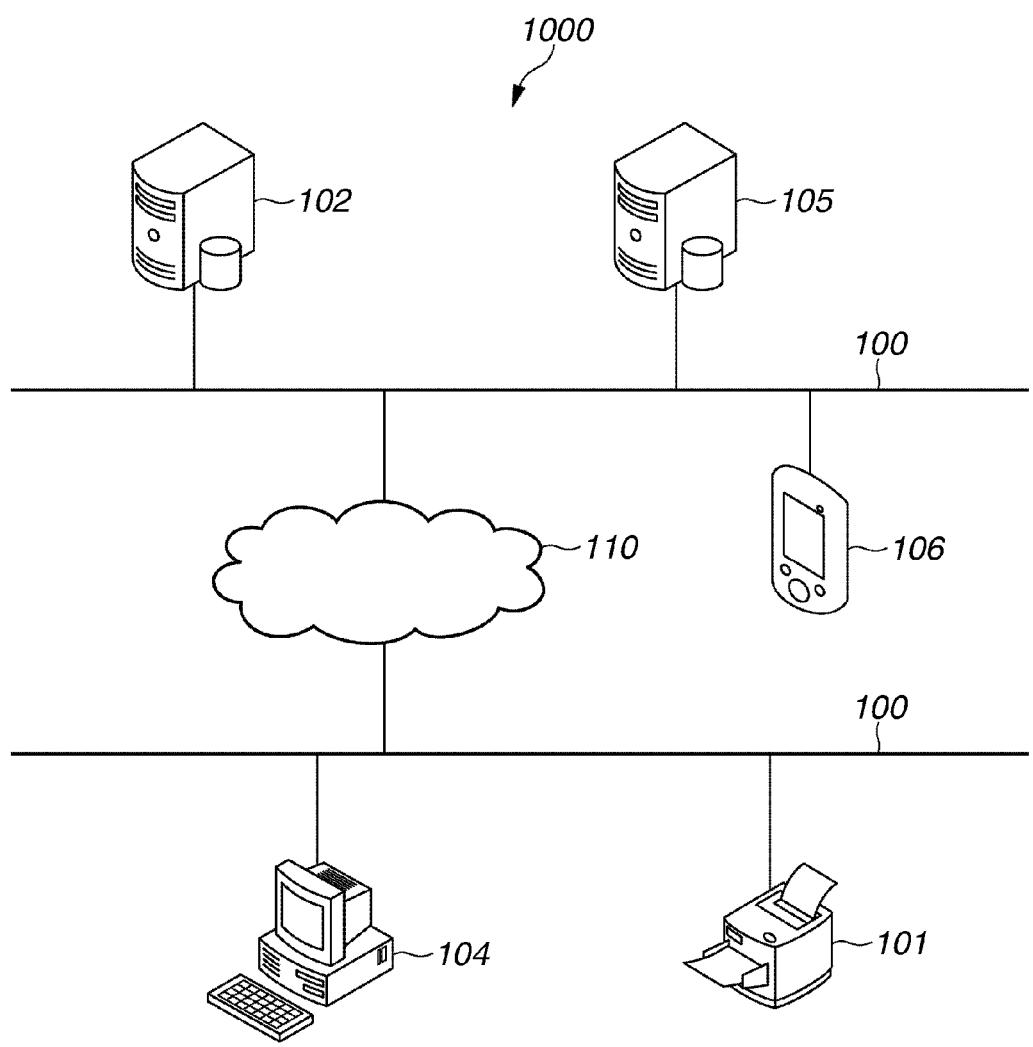
FIG. 1 illustrates an example configuration of a document management system.

A configuration of a document management system 1000 according to an exemplary embodiment is described with reference to FIG. 1. FIG. 1 illustrates an example configuration of the document management system 1000. The document management system 1000 includes an image forming device 101 and a client 104. The two devices are provided in a user environment. The apparatuses are communicatively connected to each other via a network 100, and connected to the Internet 110.

The document management system 1000 further includes a document management server 102, a data management server 105, and a mobile terminal 106. The servers and the mobile terminal 106 are communicably connected with each other via the network 100, and connected to the Internet 110.

In the present exemplary embodiment, the servers are connected via the network 100, however, the servers can be connected via the Internet 110. In the present exemplary embodiment, a plurality of servers is provided. Alternatively, a single server can be provided. Further, in the present exemplary embodiment, individual apparatuses 101, 102, 104, 015, and 106 are used. Alternatively, a plurality of apparatuses for each apparatus may be used.

Figure 2:
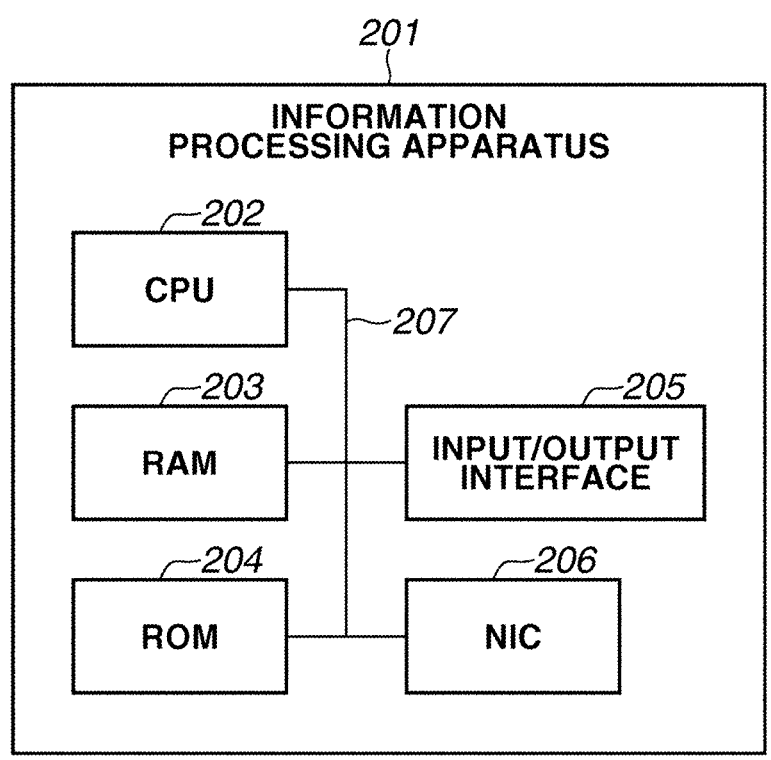
FIG. 2 is a block diagram illustrating an example hardware configuration of the information processing apparatus.

A hardware configuration of the apparatuses in the document management system 1000 is described with reference to FIG. 2. FIG. 2 illustrates the hardware configuration of the apparatuses in the document management system 1000. Each of the apparatuses in the document management system 1000 includes an information processing apparatus (computer) 201. The information processing apparatus 201 includes various units 202 to 207.

A central processing unit (CPU) 202 executes various kinds of programs to implement various functions. A read-only memory (ROM) 204 is a unit for storing various kinds of programs, and the like. A random access memory (RAM) 203 is a unit for storing various kinds of information. The RAM 203 is also used as a temporary work and storage area of the CPU 202. For example, the CPU 202 loads a program stored in the ROM 204 into the RAM 203, and executes the program.

An input/output interface 205 is a unit for transmitting data to a display (not illustrated) connected to the information processing apparatus 201, and receiving data from a pointing device (not illustrated).

A network interface card (NIC) 206 is a unit for connecting the information processing apparatus 201 to the network 100. The above-described units are configured in so that the units can transmit or receive data via a bus 207.

The image forming apparatus 101 further includes a print unit (not illustrated). The print unit is configured so that the unit can transmit or receive data to/from each unit via the bus 207. The print unit can record (print) a raster image on a recording medium such as paper.

The image forming apparatus 101 further includes a scanner unit (not illustrated). The scanner unit is configured so that the unit can transmit or receive data to/from each unit via the bus 207. The scanner unit can input an image.

In the mobile terminal 106, a touch panel (not illustrated) is connected to the input/output interface 205. The touch panel is an example of a display unit such as a display. The touch panel has two functions of output (display) and input. The touch panel displays an image or the like on a screen, and detects information at a touched point on the screen when a user touches the screen on which a picture, dots, or a region is displayed, and transmits the information of the detected point to the CPU 202.

Figure 3:
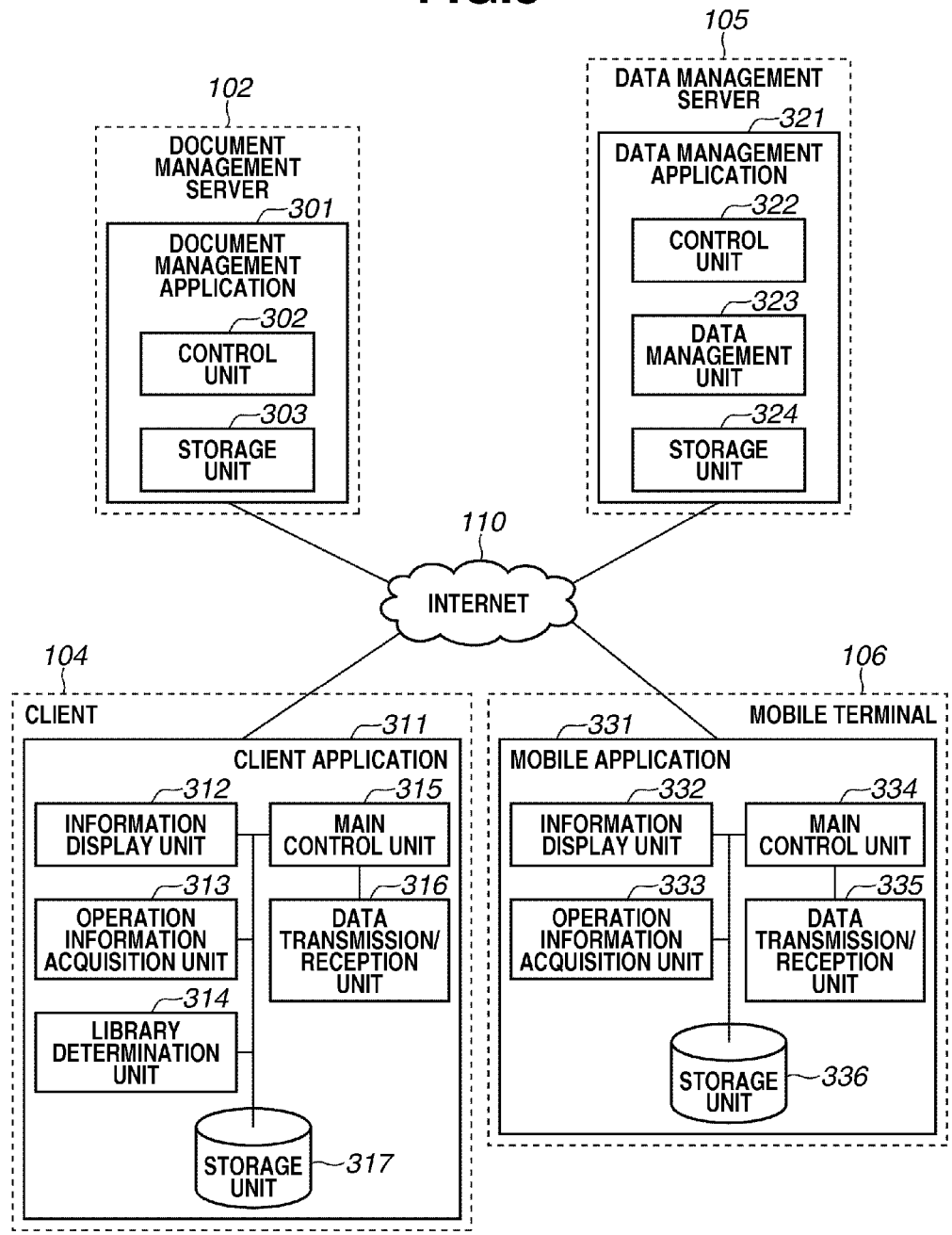
FIG. 3 is a block diagram illustrating a software configuration of each apparatus.

Software configurations of the apparatuses in the document management system 1000 are described with reference to FIG. 3. FIG. 3 illustrates software configurations of the individual apparatuses in the document management system 1000.

A program for implementing the functions (module units) in the individual software (application) illustrated in FIG. 3 is stored in the ROM 204, or the like in each apparatus. In other words, the functions of the apparatuses and processing according to flowcharts described below can be implemented by loading the program into the RAM 203 and executing the program by the CPU 202. Apart of or all of the functions of the apparatuses and the processing according to the flowcharts described below can be implemented by using dedicated hardware.

Next, a software configuration in the mobile terminal 106 is described. The mobile terminal 106 is an example of the mobile terminal. The mobile terminal 106 is provided with a wireless communication function, and the like, and can be freely used at anywhere. The mobile terminal 106 is used to request the data management server 105 to perform various data processing to data (document, or the like) managed by the data management server 105.

A main control unit 334 controls application (mobile application) 331 for the mobile terminal 106, and instructs and manages each module unit described below. An information display unit 332 provides a user with a user interface (UI) for the mobile application 331 according to an instruction from the main control unit 334.

Figure 4:
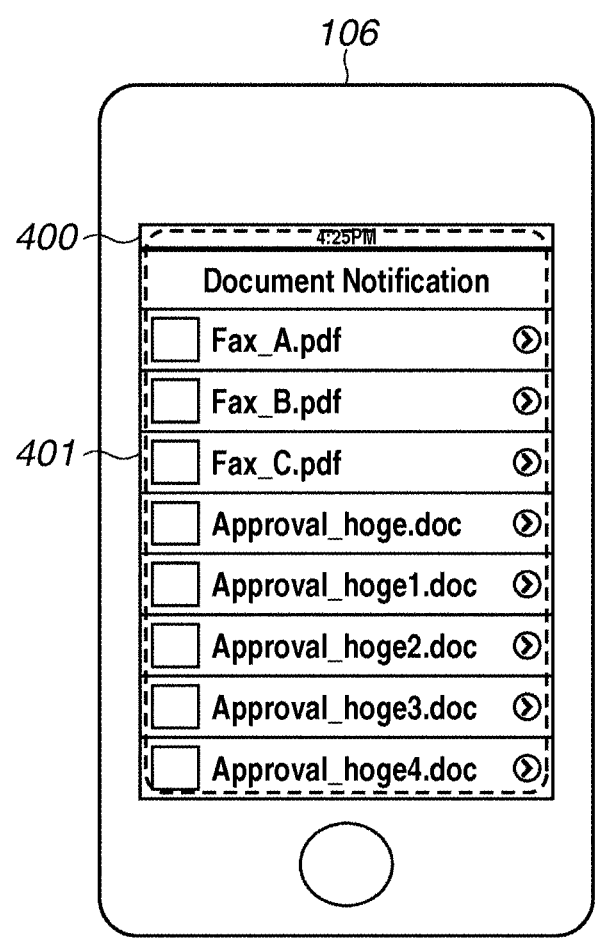
FIG. 4 illustrates an example mobile terminal screen.

FIG. 4 illustrates a screen (mobile terminal screen 400) for providing the UI (UI for mobile terminal) for the mobile application 331. The mobile terminal screen 400 is displayed on the touch panel of the mobile terminal 106. On the mobile terminal screen 400, the UIs such as icons and buttons indicating documents are displayed in an area 401 for display and operation. Via the displayed available UI, an operation to a document or the like by a user (user operation) is received.

The forms of the UI such as the positions, the sizes, the areas, the arrangements, and the display contents of the mobile application 331 are not limited to the example illustrated in FIG. 4. Alternatively, an appropriate configuration capable of implementing the functions of the mobile terminal 106 can be employed.

An operation information acquisition unit 333 acquires information generated by the user operating the UI of the mobile application 331 displayed by the information display unit 332, and notifies the main control unit 334 of the acquired information. For example, when the user touches the area 401 on which a picture, dots, a region, or the like is displayed, the operation information acquisition unit 333 senses the information at the touched point on the screen, and transmits the information at the sensed point to the main control unit 334.

A data transmission and reception unit 335 transmits or receives data to/from the document management server 102, the data management server 105, or the like, and transmits or receives the data to be transmitted or received to/from the main control unit 334. A storage unit 336 stores a setting value input by the user via the information display unit 332 and the operation information acquisition unit 333, in other words, via the UI of the mobile application 331.

Next, a software configuration in the client 104 is described. The client 104 is an example of the information processing terminal. The client 104 is used to request the data management server 105 to perform various kinds of data processing to data (document or the like) managed by the data management server 105.

A main control unit 315 controls application (client application 311) for the client 104, and instructs and manages each module unit described below. An information display unit 312 provides the user with a UI for the client application 311 according to an instruction from the main control unit 315.

Figure 5:
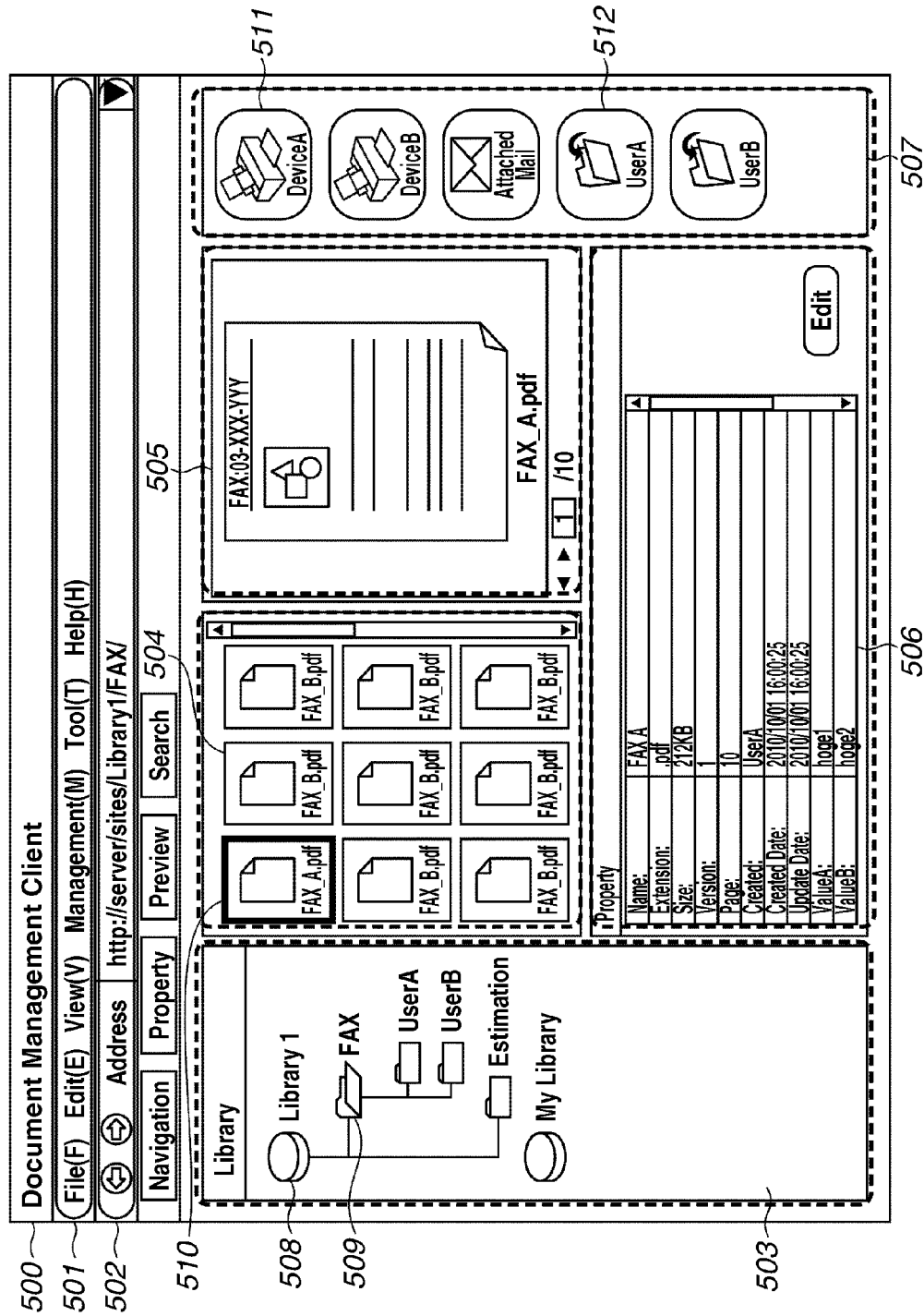
FIG. 5 illustrates an example client screen.

FIG. 5 illustrates an example screen (client screen 500) for providing the UI (UI for information processing terminal) for the client application 311. A repository area 503 is, for example, a tree view. The repository area 503 displays repository information of a library icon 508, a folder icon 509, and the like. A document list area 504 displays documents in forms of thumbnail, icon, and the like.

A document preview area 505 displays a preview image of a document corresponding to a selected document icon (document 510). A property area 506 displays properties of the document corresponding to the selected document icon. Via the property area 506, the properties of the document corresponding to the selected document icon can be edited.

An output list area 507 displays a UI 511, a destination folder UI 512, and the like. The UI 511 is for receiving an instruction for causing a peripheral apparatus such as an image forming apparatus to perform processing on a document. The UI 512 is for displaying a folder of a destination of a document (an example of the storage area), and receiving an instruction for moving the document to the folder.

An address bar 502 displays location information for indicating the location of a document (item) corresponding to a selected document icon in the repository area 503, the document list area 504, and the like. A menu bar 501 displays items (options) for inputting a setting value in the client application 311. When the user operates the UI of the client application 311, destination setting processing, monitor target folder setting processing, and destination folder setting processing described below are executed.

The forms such as the positions, the sizes, the areas, the arrangements, and the display contents of the client application 311 are not limited to the example illustrated in the FIG. 5. Alternatively, an appropriate configuration capable of implementing the functions of the client 104 can be employed. For example, in the document list area 504 and the output list area 507, instead of the thumbnails and icons, a list of character strings of file names for specifying documents, or apparatus names for specifying peripheral apparatuses can be displayed.

An operation information acquisition unit 313 acquires information generated by the user operating the UI of the client application 311 displayed by an information display unit 312, and notifies a main control unit 315 of the acquired information. A library determination unit 314 determines a destination at the time of registration of a library and at the time of the use of the library.

A storage unit 317 stores a setting value input by the user via the information display unit 312 and the operation information acquisition unit 313, in other words, via the UI of the client application 311. A data transmission and reception unit 316 transmits or receives data to/from the document management server 102, the data management server 105, or the like, and transmits or receives the data to be transmitted or received to/from the main control unit 315.

Next, a software configuration in the document management server 102 is described. The document management server 102 is an example of the management apparatus for managing data such as a document.

An application (document management application 301) for the document management server 102 includes a control unit 302 and a storage unit 303. The document management application 301 serves as an application for managing documents with commonly-known functions.

Next, a software configuration in the data management server 105 is described. The data management server 105 is an example of the storage apparatus for storing data such as setting values of UIs. An application (data management application 321) for the data management server 105 includes a control unit 322, a data management unit 323, and a storage unit 324.

The control unit 322 controls the data management application 321. The control unit 322 receives requests from the client 104 and the mobile terminal 106 via the network 100. The data management unit 323 registers, acquires, or searches data stored in the storage unit 324, or deletes the data.

The data transmitted or received between the client 104 and the data management server 105 is described with reference to FIGS. 6A to 6C.

Figure 6A:
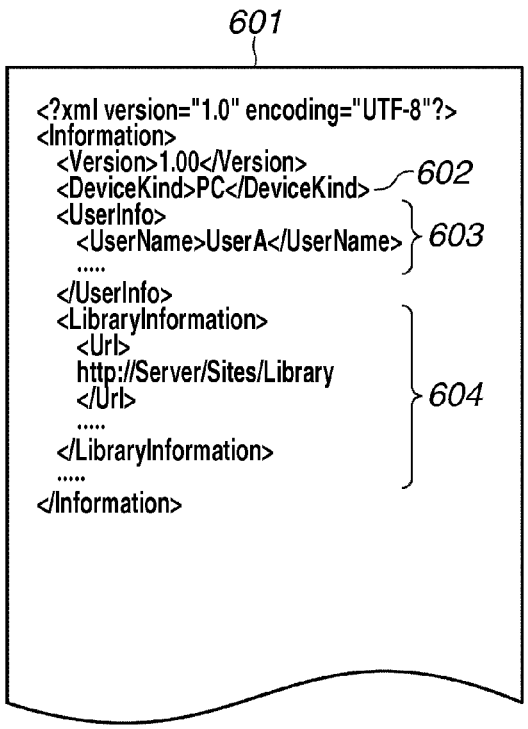
FIGS. 6A, 6B, and 6C illustrate example data to be transmitted or received.

FIG. 6A illustrates an example of the data (destination information XML 601) transmitted or received between the client 104 and the data management server 105 in destination information setting processing described below. A type 602 of the apparatus indicates the type of the apparatus of the transmission source. User information 603 indicates information about the user. A library path 604 indicates a path (library path) such as a Uniform Resource Locator (URL) entered by the user on a library destination setting screen 1101 described below.

Figure 6B:
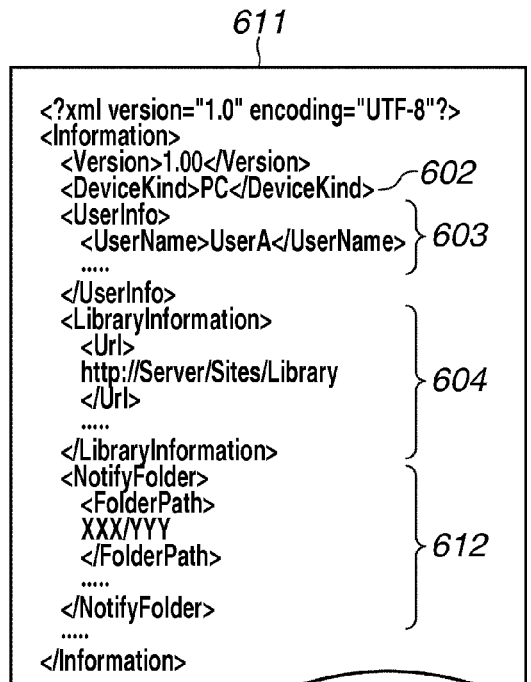

FIG. 6B illustrates an example of the data (monitor target folder information XML 611) transmitted or received between the client 104 and the data management server 105 in monitor target folder setting processing described below. A monitor target folder path 612 indicates a path (folder path) of a folder specified as a target (monitor target) of monitoring by the user on the client screen 500.

Figure 6C:
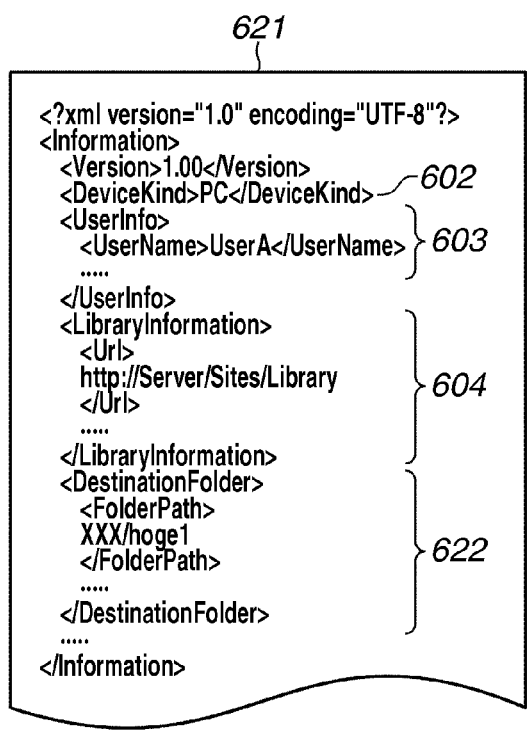

FIG. 6C illustrates an example of the data (destination folder information XML 621) transmitted or received between the client 104 and the data management server 105 in destination folder setting processing described below. A destination folder path 622 indicates a path (folder path) of a folder specified as a destination of a file by the user on the client screen 500.

The data is described in detail with reference to flowcharts described below. In the present exemplary embodiment, the data of the XML formats is used for the data transmitted or received between the client 104 and the data management server 105. Alternatively, data of a JavaScript Object Notation (JSON) format or other formats can be employed.

Table structures of a database managed by the data management unit 323 and the storage unit 324 in the data management application 321 in the data management server 105 are described with reference to FIGS. 7A to 7D. In the present exemplary embodiment, it is assumed that the database is provided in a storage apparatus such as a hard disk connected to the input/output interface 205 in the data management server 105.

FIG. 7A illustrates an example table (user information management table 700) for managing information of users. The user information management table 700 includes information of UserID 701 for uniquely specifying users, and information of UserName 702 for indicating user names.

FIG. 7B illustrates an example table (destination information management table 710) for managing information of destinations. The destination information management table 710 includes information of Lib_ID 711, UserID 712, LibraryURL 713, DeviceKind 714, Order 715, and DisableMobile 716. The Lib_ID 711 indicates an identifier capable of uniquely specifying a record (destination information).

The UserID 712 indicates an identifier capable of uniquely specifying whose record it is. The Library URL 713 indicates a path of a destination. In the present exemplary embodiment, the destination is a library in the document management server 102 to which the mobile terminal 106 is connected. The DeviceKind 714 indicates an apparatus in which an input about a record is performed. The Order 715 indicates a display order. The DisableMobile 716 indicates that deletion processing is performed from the mobile terminal 106.

FIG. 7C illustrates an example table (monitor target folder information management table 720) for managing information of folders to be monitored. The monitor target folder information management table 720 includes information of Notify_ID 721, Lib_ID 722, NotifyFolder 723, DeviceKind 724, Order 725, and DisableMobile 726.

The Notify_ID 721 indicates an identifier capable of uniquely specifying a record (monitor target folder information). The Lib_ID 722 indicates an identifier capable of specifying to which destination the record belongs. The NotifyFolder 723 indicates a folder to be monitored. The DeviceKind 724 indicates an apparatus in which an input about a record is performed. The Order 725 indicates a display order. The DisableMobile 726 indicates that deletion processing is performed from the mobile terminal 106.

FIG. 7D illustrates an example table (destination folder information management table 730) for managing information of folders specified as destinations. The destination folder information management table 730 includes information of Dist_ID 731, Lib_ID 732, DistinationFolder 733, DeviceKind 734, Order 735, and DisableMobile 736.

The Dist_ID 731 indicates an identifier capable of uniquely specifying a record (destination folder information). The Lib_ID 732 indicates an identifier capable of specifying to which destination the record belongs. The DistinationFolder 733 indicates a folder of a destination. The DeviceKind 734 indicates an apparatus in which an input about a record is performed. The Order 735 indicates a display order. The DisableMobile 736 indicates that deletion processing is performed from the mobile terminal 106.

The records in the tables are described in detail with reference to flowcharts described below.

Figure 8:
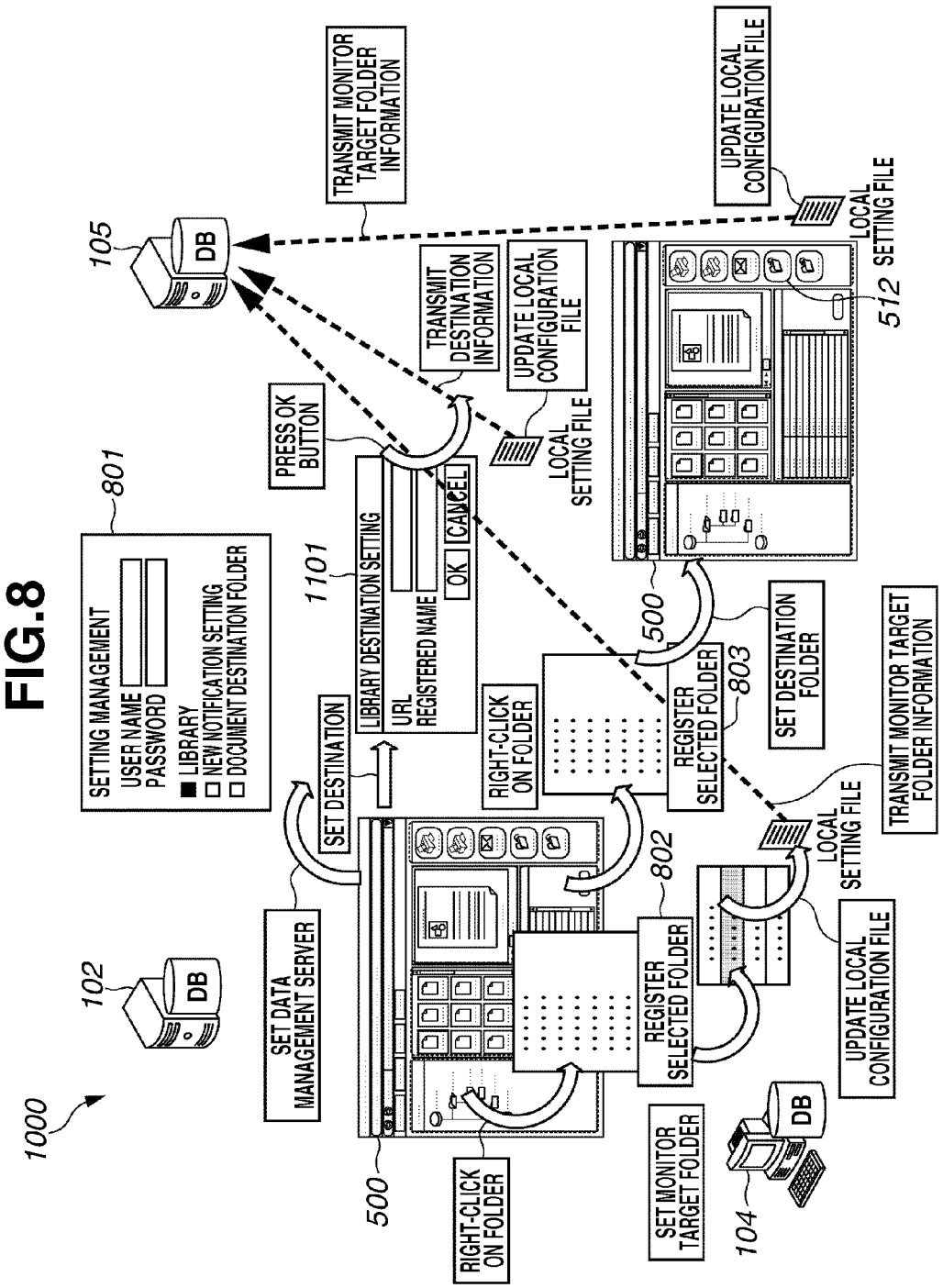
FIG. 8 illustrates an example processing in a client.

A summary of the processing performed in the client 104 is described with reference to FIG. 8. In the client 104, via a setting management screen 801, a target (library, monitor folder, or destination folder) to be set is selected, and authentication information (user name, password, or the like) is entered, and the client 104 transmits the information to the data management server 105.

For example, when the item "INPUT DESTINATION" provided on the menu bar 501 on the client screen 500 is clicked (selected), the client 104 displays a library destination setting screen 1101 described below.

The client 104 reflects the setting value entered on the screen in the local setting file, and depending on the location (installation location) the document management server 102 is provided, transmits the destination information XML 601 or the like to the data management server 105. The data is described in detail with reference to the destination information setting processing described below.

For example, when a folder icon on the client screen 500 is right-clicked and the item "SET SELECTED FOLDER AS MONITOR TARGET" 802 is clicked, the client 104 reflects the information of the folder corresponding to the selected folder icon into the local setting file. Then, the client 104, depending on the installation location of the document management server 102, transmits the monitor target folder information XML 611, or the like to the data management server 105. The processes are described in detail in the monitor target folder setting processing described below.

For example, when a folder icon on the client screen 500 is right-clicked and the item "REGISTER SELECTED FOLDER" 803 is clicked, the client 104 reflects the information in the folder corresponding to the selected folder icon into the local setting file. Then, depending on the installation location of the document management server 102, the client 104 transmits the destination folder information XML 621, or the like to the data management server 105. The processes are described in detail in the destination folder setting processing described below.

The client 104 has a plurality of user interfaces, and setting values to be set to the individual UIs are input in advance.

Figure 9:
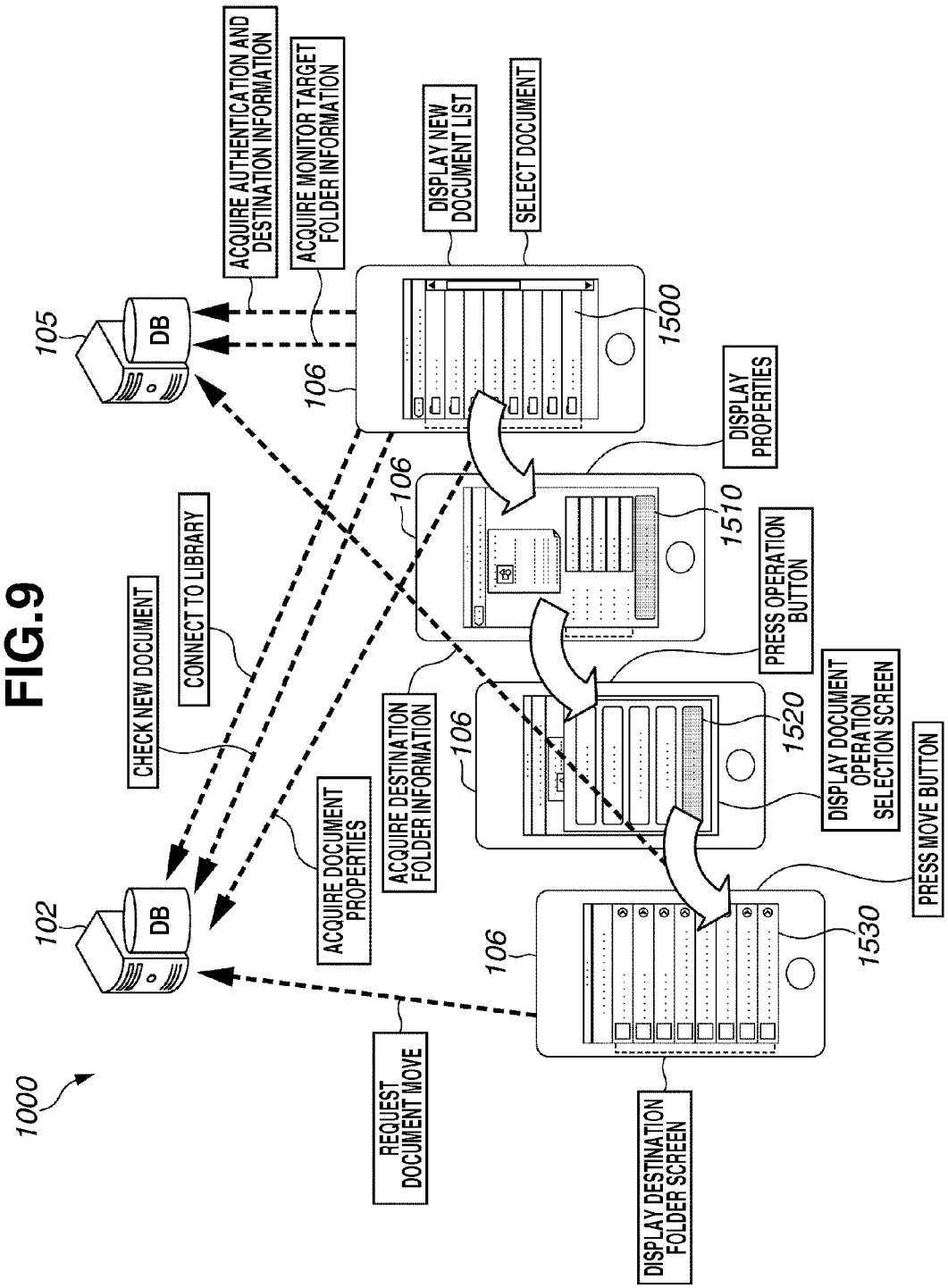
FIG. 9 illustrates an example processing in a mobile terminal.

A summary of the processing performed in the mobile terminal 106 is described with reference to FIG. 9. The mobile terminal 106 requests authentication to the data management server 105 and acquires destination information and monitor target folder information. Further, the mobile terminal 106 acquires destination folder information at an appropriate timing. The mobile terminal 106 has a UI corresponding to the UI in the client 104. The acquired information, that is, the setting values in the UI input in the client 104, are set to the corresponding UI.

For example, in the mobile terminal 106, as will be described below, screens transfer from a new document list screen 1500 to a document property screen 1510, a document operation selection screen 1520, and a destination folder selection list screen 1530. On the destination folder selection list screen 1530, an instruction to move a document in the document management server 102 to a specified folder is received. These processes are described in detail in the mobile processing described below.

Figure 10:
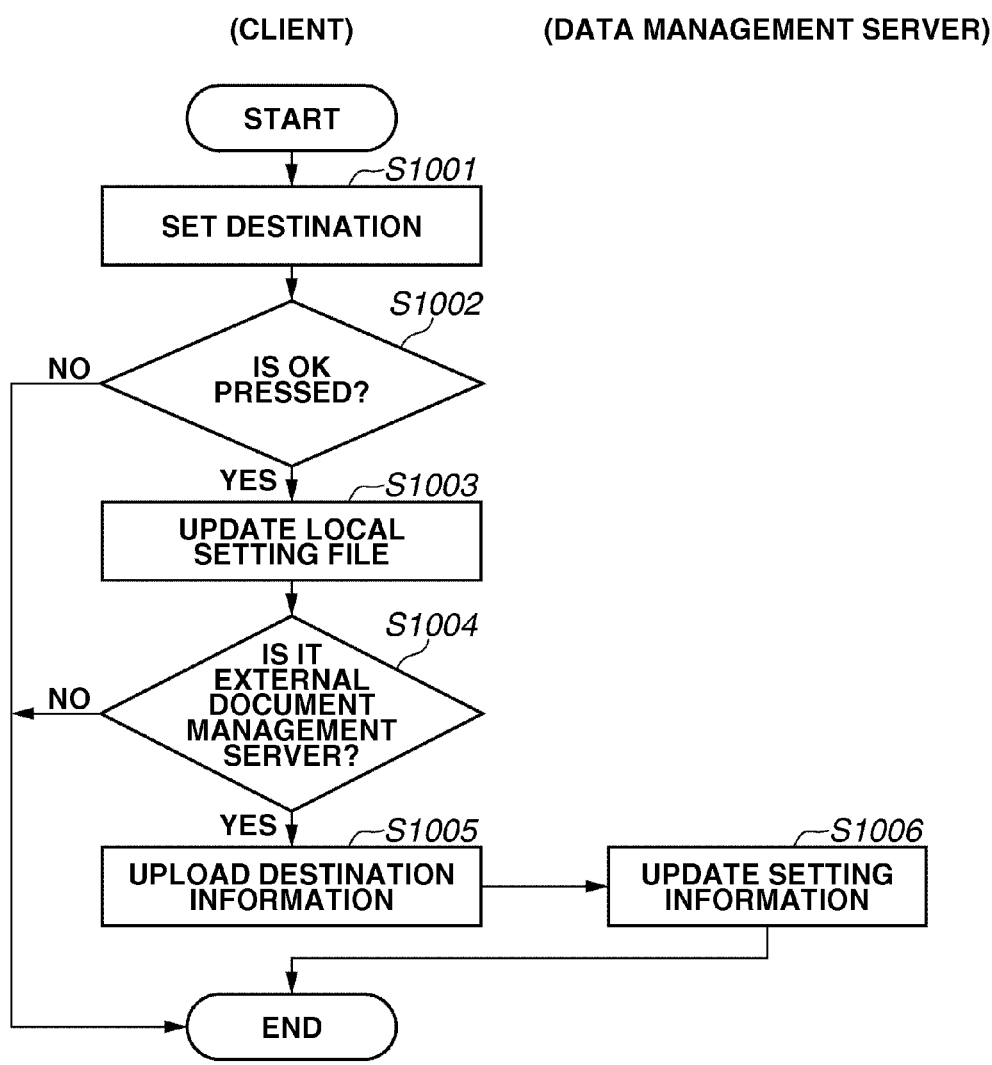
FIG. 10 is an example flowchart of destination information setting processing.

The destination information setting processing for registering destination information relating to a library to which the client application 311 in the client 104 is connected to the data management server 105 is described with reference to FIG. 10. FIG. 10 illustrates a flowchart of the destination information setting processing.

In the processing, the client application 311 is started in response to an instruction by a user operation, for example, a click operation of an icon for receiving the instruction for starting the client application 311. In response to the instruction, the main control unit 315 instructs the information display unit 312 to display the UI for the client application 311 on a display (not illustrated) in the client 104.

The main control unit 315 reads the information of the registered library from the storage unit 317 (local setting file), and displays an icon (library information) indicating the library on the repository area 503. The main control unit 315 specifies a document in the folder selected by the user operation on the repository 503 and displays a document icon indicating the document in the document list area 504.

Further, the main control unit 315 acquires information of an apparatus such as the image forming apparatus 101 that can be operated by the client 104, and displays an icon indicating the apparatus on an output list area 507. The main control unit 315 reads the information of the registered destination folder from the storage unit 317, and displays an icon (destination folder UI) indicating the folder in the output list area 507.

In step S1001, when a menu item (not illustrated) for inputting a destination of the library provided in the menu bar 501 is selected by a user operation, the main control unit 315 instructs the information display unit 312 to display the library destination setting screen 1101.

Figure 11:
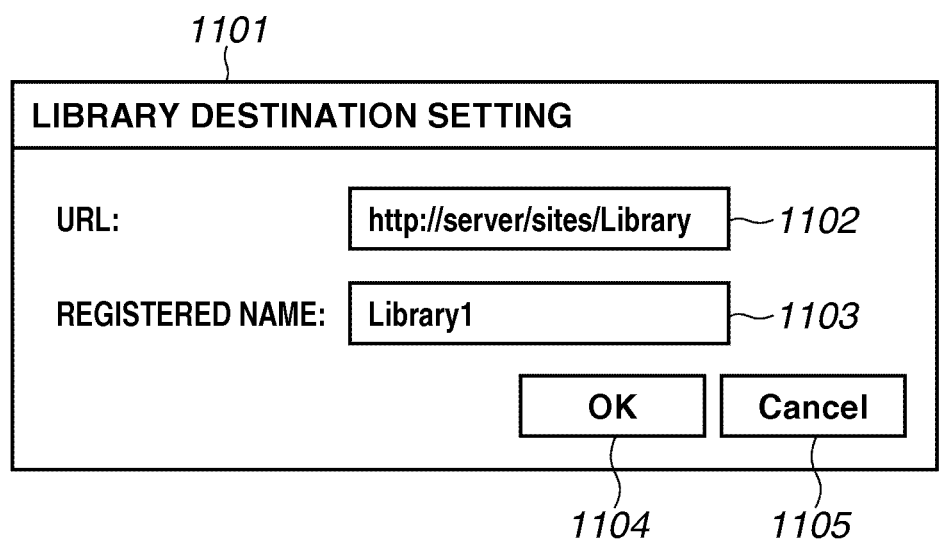
FIG. 11 illustrates an example library destination setting screen.

FIG. 11 illustrates an example of the library destination setting screen 1101. The library path input text box 1102 is an example of a UI for inputting a library path. The registered name input text box 1103 is an example of a UI for inputting a name (registered name) of a library to be registered. The OK button 1104 is an example of a UI for fixing the input. The cancel button 1105 is an example of a UI for canceling the input.

From the library destination setting screen 1101, the user inputs a library path and a name to be registered for connecting to the document management server 102.

In step S1002, the operation information acquisition unit 313 determines whether the UI (the OK button 1104 on the library destination setting screen 1101) for fixing the input is pressed. If the operation information acquisition unit 313 determines that the UI is pressed (YES in step S1002), the processing proceeds to step S1003. If the operation information acquisition unit 313 determines that the UI is not pressed (NO in step S1002), the processing ends.

If the operation information acquisition unit 313 determines that the UI is pressed, the operation information acquisition unit 313 notifies the main control unit 315 that the UI is pressed. In step S1003, the main control unit 315 stores the information of the library path and the registered name input on the library destination setting screen 1101 by the user into the local setting file in the storage unit 317.

In step S1004, the library determination unit 314 specifies a host name from the library path, transmits an inquiry to a Domain Name System (DNS) server (not illustrated), and specifies an IP address of the document management server 102. The library determination unit 314 determines whether the document management server 102 is provided in the network 100 or a network (external network) via the Internet 110 using the IP address.

If the library determination unit 314 determines that the document management server 102 is provided in an external network (YES in step S1004), the processing proceeds to step S1005. If the library determination unit 314 determines that the document management server 102 is provided in the network 100 (NO in step S1004), the processing ends. If the library determination unit 314 determines that the document management server 102 is provided in an external network, the library determination unit 314 notifies the main control unit 315 that the document management server 102 is provided in the external network.

In step S1005, the main control unit 315 instructs the data transmission and reception unit 316 to transmit the destination information (the destination information XML 601, or the like) to the data management server 105.

In step S1006, when the control unit 322 in the data management server 105 receives the data transmission request from the client 104, the control unit 322 analyzes the contents of the destination information, and instructs the data management unit 323 to store the data. The data management unit 323 stores the data in the destination information management table 710 in the storage unit 324. The record 717 illustrated in FIG. 7B is an example of the setting information, the example that the data of the destination information XML 601 is stored in the destination information management table 710.

Figure 12:
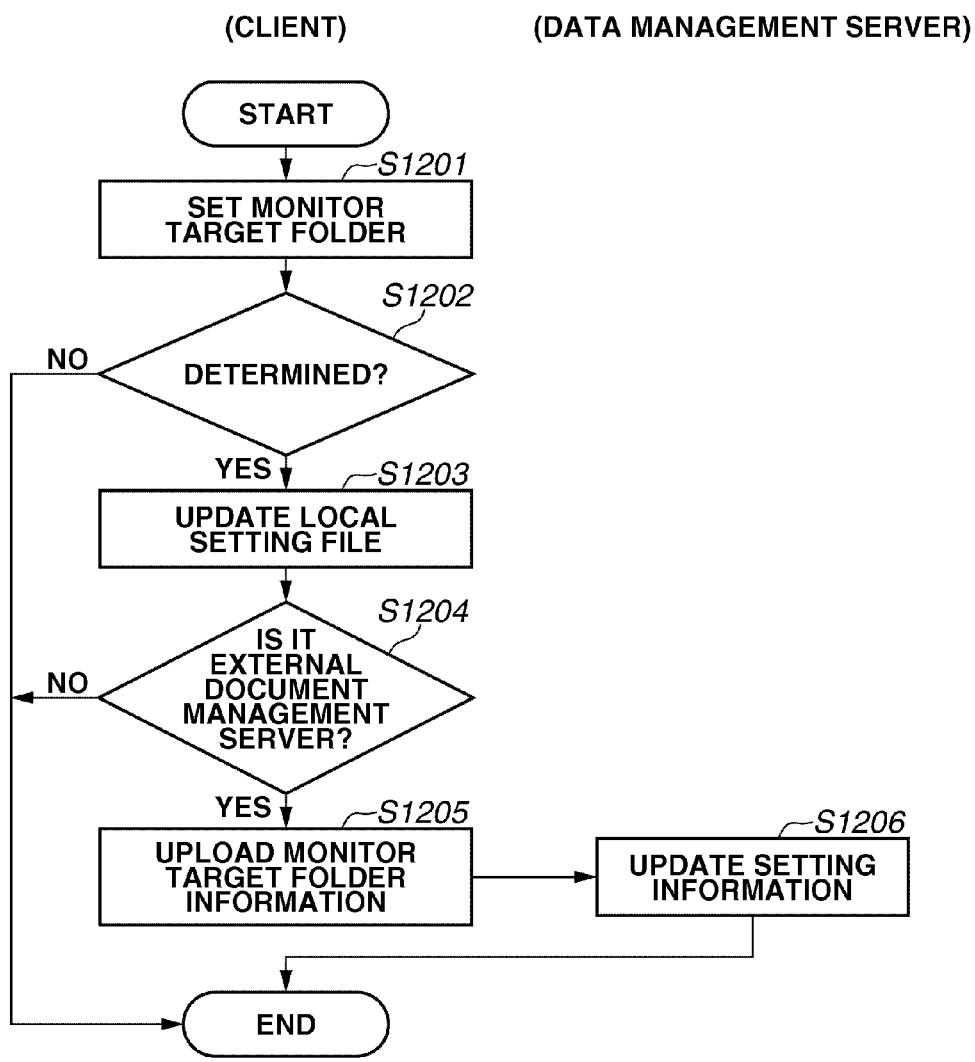
FIG. 12 is an example flowchart of monitor target folder setting processing.

The monitor target folder setting processing for registering monitor target folder information relating to a folder to be monitored in a library by the client application 311 in the client 104 into the data management server 105 is described with reference to FIG. 12. FIG. 12 illustrates a flowchart of the monitor target folder setting processing.

In step S1201, when a folder icon in the repository area 503 is selected and right-clicked, the information display unit 312 displays a list of operable operations to the folder corresponding to the selected folder icon. For example, on the operation list, the "SET SELECTED FOLDER AS MONITOR TARGET" item 802 is displayed.

In step S1202, the operation information acquisition unit 313 determines whether the folder to be monitored is fixed, that is, whether the "SET SELECTED FOLDER AS MONITOR TARGET" item 802 is pressed. If the operation information acquisition unit 313 determines that the folder to be monitored is fixed (YES in step S1202), the processing proceeds to step S1203. If the operation information acquisition unit 313 determines that the folder to be monitored is not fixed (NO in step S1202), the processing ends. If the operation information acquisition unit 313 determines that the folder to be monitored is fixed, the unit 313 notifies the main control unit 315 that the folder to be monitored is fixed.

In step S1203, the main control unit 315 stores the information of the library path of the library to which the folder corresponding to the selected folder icon and the information of the folder path of the folder corresponding to the selected folder icon into the local setting file in the storage unit 317.

In step S1204, the library determination unit 314 determines whether the document management server 102 that has the library to which the folder corresponding to the selected folder icon belongs, is provided in an external network. The determination method is similar to that in step S1004, and accordingly, its detailed description is omitted.

In step S1205, the main control unit 315 instructs the data transmission and reception unit 316 to transmit the monitor target folder information (the monitor target folder information XML 611, or the like) to the data management server 105.

In step S1206, when the control unit 322 in the data management server 105 receives the data transmission request from the client 104, the control unit 322 analyzes the contents of the monitor target folder information, and instructs the data management unit 323 to store the data. The data management unit 323 stores the data in the monitor target folder information management table 720 in the storage unit 324. The record 727 illustrated in FIG. 7C is an example of the setting information, the example that the data of the monitor target folder information XML 611 is stored in the monitor target folder information management table 720.

Figure 13:
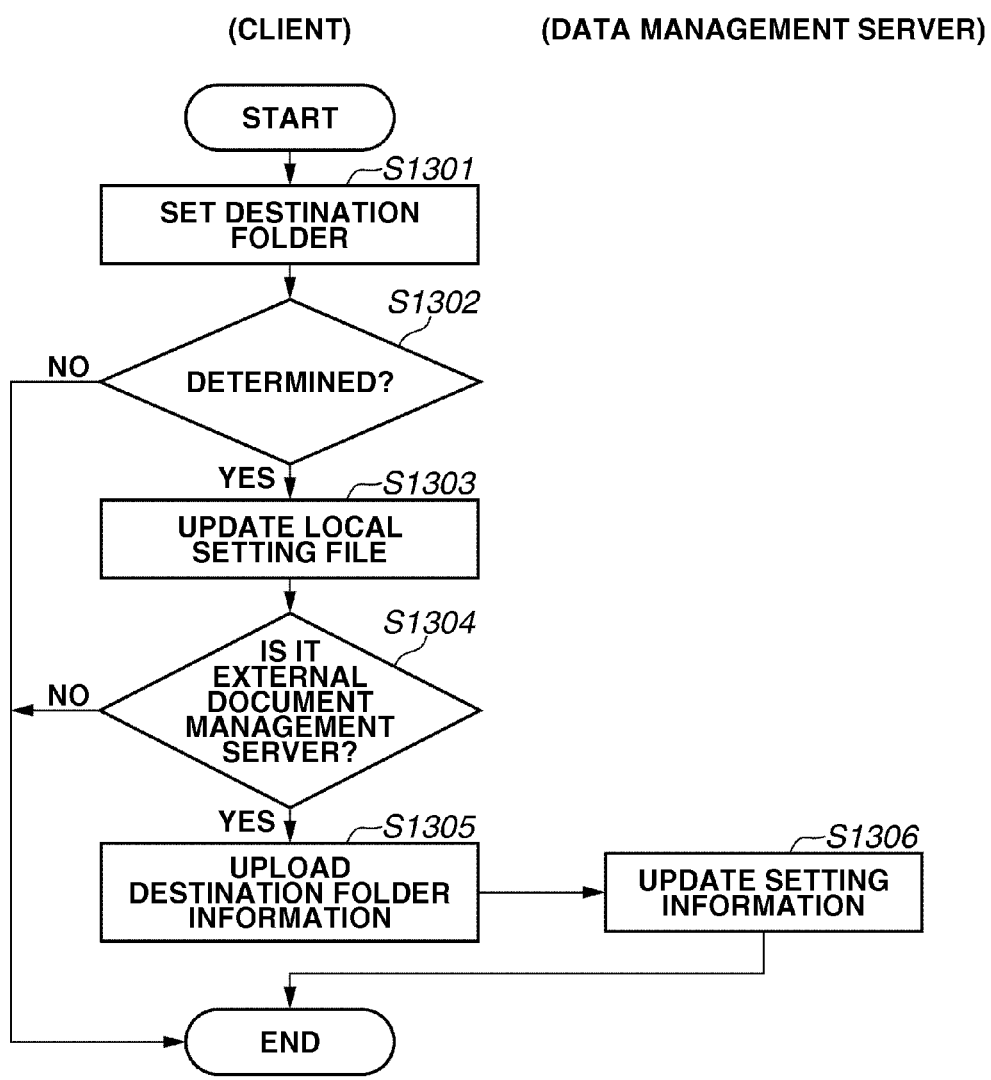
FIG. 13 is an example flowchart of destination folder setting processing.

The destination folder setting processing for registering destination folder information relating to a folder to be specified as a destination in a library by the client application 311 in the client 104 into the data management server 105 is described with reference to FIG. 13. FIG. 13 illustrates a flowchart of the destination folder setting processing.

In step S1301, when a folder icon in the repository area 503 is selected and right-clicked by the user operation, the information display unit 312 displays a list of operable operations to the folder corresponding to the selected folder icon. For example, on the operation list, the "REGISTER SELECTED FOLDER" item 803 is displayed.

In step S1302, the operation information acquisition unit 313 determines whether the folder to be registered is fixed, that is, whether the "REGISTER SELECTED FOLDER" item 803 is pressed. If the operation information acquisition unit 313 determines that the folder to be registered is fixed (YES in step S1302), the processing proceeds to step S1303. If the operation information acquisition unit 313 determines that the folder to be registered is not fixed (NO in step S1302), the processing ends. If the operation information acquisition unit 313 determines that the folder to be registered is fixed, the unit 313 notifies the main control unit 315 that the folder to be registered is fixed.

The method of receiving the folder to be registered in not limited to the above-described method. For example, a method of dragging and dropping the folder icon of the folder to be registered in the repository area 503 into the output list area 507 can be employed.

Next, the processing in steps S1303 and S1304 is performed. The processing is similar to that performed in steps S1203 and S1204, and consequently, its description is omitted.

In step S1305, the data transmission and reception unit 316 transmits the destination folder information (the destination folder information XML 621, or the like) to the data management server 105.

In step S1306, when the control unit 322 in the data management server 105 receives the data transmission request from the client 104, the control unit 322 analyzes the contents of the destination folder information, and instructs the data management unit 323 to store the data. The data management unit 323 stores the data in the destination folder information management table 730 in the storage unit 324.

The record 737 illustrated in FIG. 7D is an example of the setting information, the example that the data of the destination folder information XML 621 is stored in the destination folder information management table 730.

The mobile processing for processing a document in a monitor target folder in the document management server 102 by the mobile application 331 in the mobile terminal 106 is described with reference to FIG. 14. FIG. 14 illustrates an example flowchart of the mobile processing.

The mobile processing includes move processing for moving a new document in a monitor target folder to a destination folder, deletion processing for deleting a document, a permission processing for permitting a document, and change processing for changing a property of a document. Hereinbelow, the move processing is described as an example.

In the processing, the mobile application 331 in the mobile terminal 106 is started in response to an instruction by the user operation, for example, a click operation of an icon for receiving the instruction for starting the mobile application 331.

In step S1401, the main control unit 334 instructs the data transmission and reception unit 335 to request the destination information to the data management server 105.

In step S1402, the control unit 322 in the data management server 105 specifies a user (user ID) from a user name contained in the request of the destination information, or the like. The control unit 322 instructs the data management unit 323 to acquire the destination information of the specified user from the destination information management table 710. The control unit 322 returns the acquired destination information to the mobile terminal 106.

In step S1403, the main control unit 334 in the mobile terminal 106 instructs the data transmission and reception unit 335 to transmit a request for connecting to the library to the document management server 102 using the destination information acquired from the data management server 105. In step S1404, the control unit 302 in the document management server 102 connects to the library. In step S1405, the main control unit 334 in the mobile terminal 106 instructs the data transmission and reception unit 335 to request the monitor target folder information to the data management server 105.

In step S1406, the control unit 322 in the data management server 105 specifies the user from a user name contained in the request of the monitor target folder information, or the like. The control unit 322 instructs the data management unit 323 to acquire the monitor target folder information of the Lib_ID associated with the specified user from the monitor target folder information management table 720. The control unit 322 returns the acquired monitor target folder information to the mobile terminal 106.

In step S1407, the main control unit 334 in the mobile terminal 106 instructs the data transmission and reception unit 335 to transmit a request for checking a new document to the document management server 102 using the monitor target folder information and the destination information acquired from the data management server 105.

In step S1408, the control unit 302 in the document management server 102 checks a new document in the monitor target folder, and returns the new document information (new document list) indicating a new document to the mobile terminal 106.

Figure 15A:
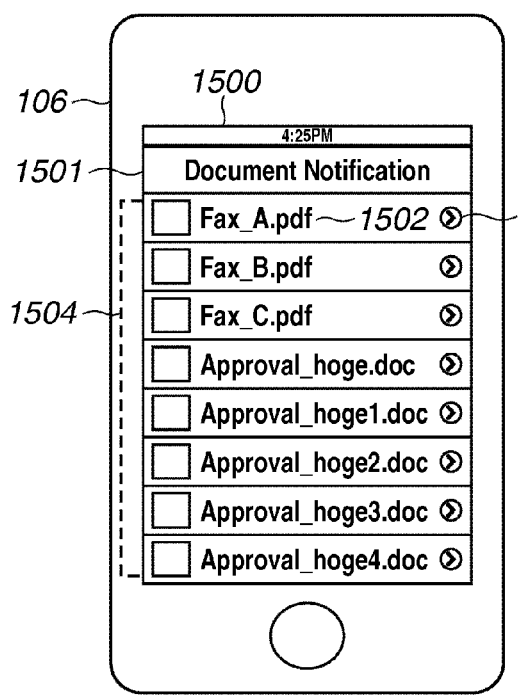
FIGS. 15A to 15F illustrate example mobile terminal screens.

In step S1409, the main control unit 334 instructs the information display unit 332 to display the new document list screen 1500 illustrated in FIG. 15A.

FIG. 15A illustrates an example of the mobile terminal screen 400 (new document list screen 1500). The document thumbnail small 1501 is a thumbnail image of a document. The document icon 1502 is an icon indicating a document. The document property button 1503 is an example of a UI for transferring to the document property screen 1510. The new document list 1504 displays a list of the document icons of the new documents returned from the document management server 102.

In step S1410, when the document property button 1503 is selected by the user operation, the main control unit 334 receives a notification from the operation information acquisition unit 333. In step S1411, the main control unit 334 instructs the data transmission and reception unit 335 to request the property information of a document corresponding to the selected document property button 1503 to the document management server 102.

In step S1412, the control unit 302 in the document management server 102 returns the property information of the document to the mobile terminal 106.

Figure 15B:
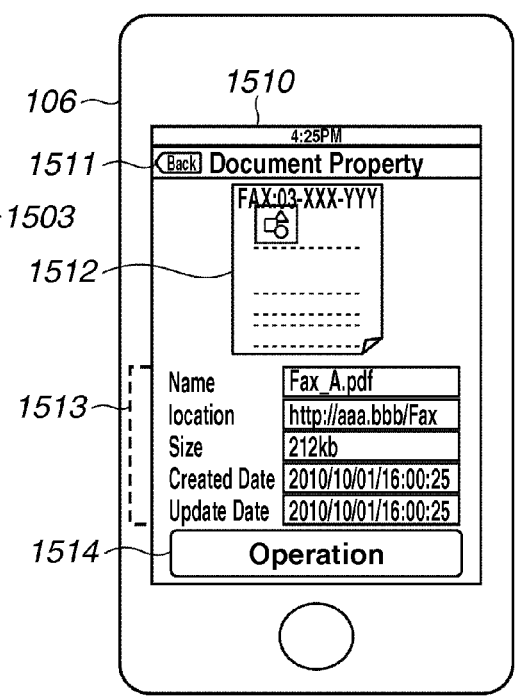

In step S1413, the main control unit 334 in the mobile terminal 106 instructs the information display unit 332 to display the document property screen 1510 illustrated in FIG. 15B.

FIG. 15B illustrates an example of the mobile terminal screen 400 (document property screen 1510). The return button 1511 is an example of a UI for returning to the new document list screen 1500. The document thumbnail large 1512 is a thumbnail image of a document. The document property list 1513 displays a list (new document list) of the information of properties of the document. The document operation selection button 1514 is an example of a UI for transferring to a screen (for example, the document operation selection screen 1520) for operating a document.

In step S1414, the operation information acquisition unit 333 determines whether the UI for transferring to the screen for operating a document is selected, that is, the document operation selection button 1514 is pressed, by the user operation. If the operation information acquisition unit 333 determines that the UI is pressed (YES in step S1414), the processing proceeds to step S1415. If the operation information acquisition unit 313 determines that the UI is not pressed (NO in step S1414), the processing ends. If the operation information acquisition unit 333 determines that the UI is pressed, the unit 313 notifies the main control unit 334 that the UI is pressed.

Figure 15C:
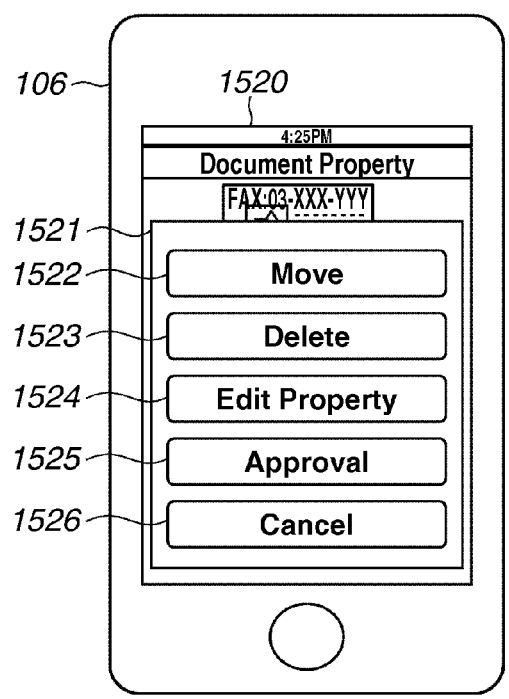

In step S1415, the main control unit 334 instructs the information display unit 332 to display the document operation selection screen 1520 illustrated in FIG. 15C.

FIG. 15C illustrates an example of the mobile terminal screen 400 (document operation selection screen 1520). The document operation selection screen 1521 displays a list of UIs for receiving operation of a document (document operation buttons). The document operation selection button 1522 is an example of a UI for transferring to a screen (for example, the document operation selection screen 1530) for moving a document.

The document deletion button 1523 is an example of a UI for transferring to a document deletion screen (not illustrated) for deleting a document. The document property edition button 1524 is an example of a UI for transferring to a document property edition screen (not illustrated) for editing (changing) properties of a document.

The document permission button 1525 is an example of a UI for transferring to a document permission screen (not illustrated) for permitting or rejecting a document. The cancel button 1526 is an example of a UI for canceling the operation of a document. When the cancel button 1526 is pressed, the screen transfers to the document property screen 1510.

In step S1416, the operation information acquisition unit 333 determines whether the UI for transferring to the screen for moving the document is selected, that is, the document move button 1522 is pressed, by the user operation. If the operation information acquisition unit 333 determines that the UI is pressed (YES in step S1416), the processing proceeds to step S1417. If the operation information acquisition unit 333 determines that the UI is not pressed (NO in step S1416), the processing ends. If the operation information acquisition unit 333 determines that the UI is pressed, the unit 333 notifies the main control unit 334 that the UI is pressed. Further, the main control unit 334 instructs the data transmission and reception unit 335 to request the destination folder information to the data management server 105.

In step S1417, the control unit 322 in the data management server 105 specifies the user from the user name contained in the request of the destination folder information, or the like. The control unit 322 instructs the data management unit 323 to acquire the destination folder information of the Lib_ID associated with the specified user from the destination folder information management table 730. The control unit 322 returns the acquired destination folder information to the mobile terminal 106.

Figure 15D:
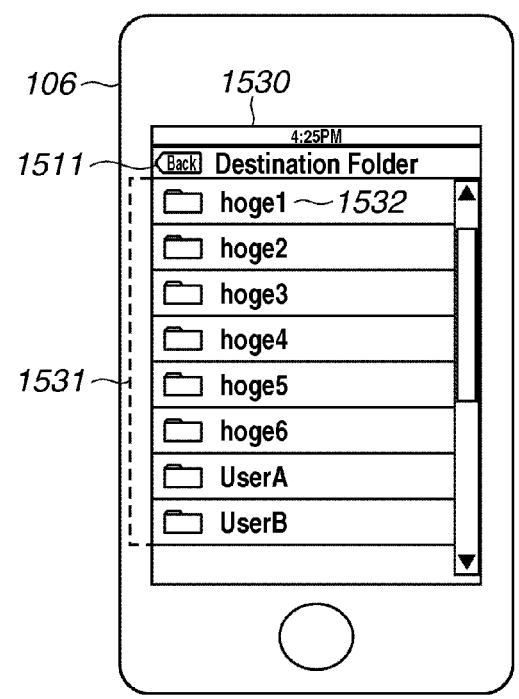

In step S1418, the main control unit 334 instructs the information display unit 332 to display the destination folder selection list screen 1530 illustrated in FIG. 15D.

FIG. 15D illustrates an example of the mobile terminal screen 400 (destination folder selection list screen 1530). The destination folder UI 1532 is an example of a UI for indicating a destination folder and receiving a move instruction of a document to the folder. The destination folder UI list 1531 displays a list of destination folder UIs.

In step S1419, when the UI (destination folder UI 1532) for receiving a move instruction of a document to the destination folder is selected by the user operation, the main control unit 334 receives a notification from the operation information acquisition unit 333. The main control unit 334 instructs the data transmission and reception unit 335 to request to move the document to the folder corresponding to the UI to the data management server 102.

In step S1420, the control unit 302 in the document management server 102 executes the move of the document.

As described above, based on the setting values input in the client 104, the mobile application 331 of the mobile terminal 106 is operated. As a result, the input of the setting values to the various setting items on the mobile terminal 106 by the user can be eliminated.

Further, the increase in the amount of the data to be managed in the data management server 105 can be prevented by managing only the setting values in the document management server 102 in the external network.

Instead of the document operation selection button 1514 in FIG. 15B, the document move button 1522 can be displayed, and in response to pressing operation of the document move button 1522, the display illustrated in FIG. 15D can be displayed.

The display regions and the operability differ between the client 104 and the mobile terminal 106. Consequently, if all of the setting values to the document management server 102 set in the client 104 are linked, the operability of the mobile terminal 106 may be lost in some cases.

To solve the problem, a configuration for preventing the loss of the operability of the mobile terminal 106 using the DeviceKind 734 in the destination folder information management table 730 is described. The DeviceKind 734 is a determination flag for determining whether a setting value is input via the client application 311 in the client 104 or via the mobile application 331 in the mobile terminal 106.

More specifically, in step S1417, the control unit 322 creates a list of destination folder information by incorporating the determination by the determination flag, and giving a higher priority to the setting value input via the mobile application 331, and return the data to the mobile terminal 106. As a result, the mobile application 331 in the mobile terminal 106 can preferentially display the destination folder UI specified in the mobile application 331.

Figure 15E:
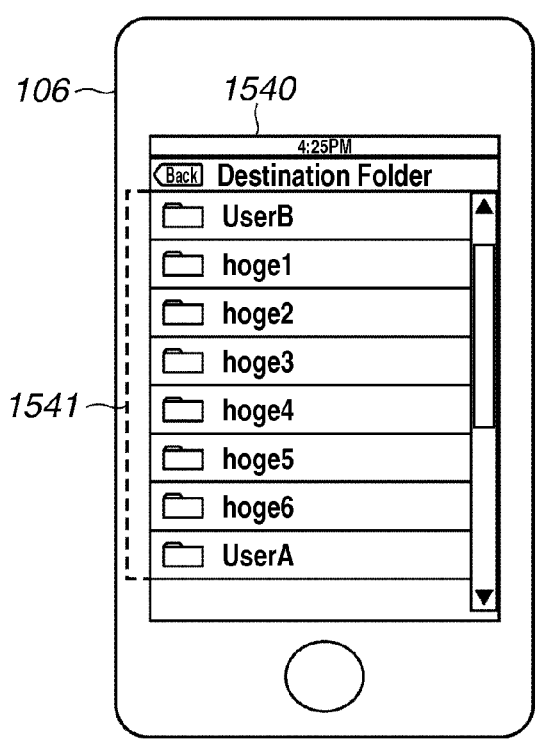

FIG. 15E illustrates an example of the mobile terminal screen 400 (destination folder selection list screen 1540) incorporating a setting value input (set) in the mobile terminal 106. On the destination folder UI list 1541, the destination folder UIs specified in the mobile terminal 106 are preferentially displayed.

As described above, whether the setting value is input via the client application 311 in the client 104 or via the mobile application 331 in the mobile terminal 106 is determined, and the UIs are displayed by prioritizing the setting value input via the mobile application 331. By the operation, the operability of the user can be increased.

The DisableMobile 736 in the destination folder information management table 730 is a determination flag indicating that the setting value is deleted in the mobile application 331 in the mobile terminal 106.

In step S1417, the control unit 322 creates a list of destination folder information by incorporating the determination by the determination flag, and returns the data to the mobile terminal 106. As a result, the mobile application 331 in the mobile terminal 106 can prevent the display of the deleted destination folder UI.

Figure 15F:
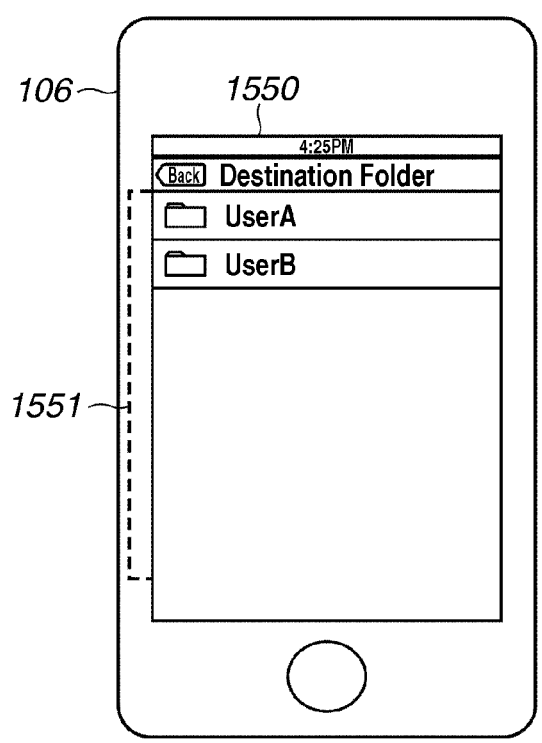

FIG. 15F illustrates an example of the mobile terminal screen 400 (destination folder selection list screen 1550) incorporating a setting value input (set) in the mobile terminal 106. On the destination folder UI list 1551, the destination folder UIs specified in the mobile terminal 106 are not displayed.

As described above, in the case whether a setting value is input via the mobile application 331 in the mobile terminal 106 is determined and the setting value is deleted in the mobile application 331 in the mobile terminal 106, the setting value is not deleted and the information is managed using the determination flag. As a result, without affecting the operability of the UIs in the client 104, on the mobile terminal 106, the display of the UI corresponding to the setting value deleted on the mobile terminal 106 can be prevented. Consequently, the operability of the user can be increased.

In a second exemplary embodiment, to configurations similar to those illustrated in the first exemplary embodiment, the same reference numerals are applied thereto and descriptions thereof are omitted as appropriate.

Tables of a database managed by the data management unit 323 and the storage unit 324 in the data management application 321 in the data management server 105 are described with reference to FIGS. 16A and 16B.

FIG. 16A illustrates an example table (an operation history information management table 1600) for managing information indicating a history of operations of the document operation button.

The operation history information management table 1600 includes information of Opehistory_ID 1601, Notify_ID 1602, and OperationHistory 1603. Opehistory_ID 1601 indicates an identifier capable of uniquely specifying a record (operation history information). Notify_ID 1602 indicates an identifier capable of uniquely specifying monitor target folder information. OperationHistory 1603 indicates the executed operation FIG. 16B illustrates an example table (move history information management table 1610) for managing information of a history of folders containing a moved document.

The move history information management table 1610 includes information of Disthistory_ID 1611, Notify_ID 1612, and DistinationHistory 1613. Disthistory_ID 1611 indicates an identifier capable of uniquely specifying a record (move history information). Notify_ID 1612 indicates an identifier capable of uniquely specifying monitor target folder information. DistinationHistory 1613 indicates a destination folder containing a moved document.

The document move processing for moving a new document in a monitor target folder to another folder by the client application 311 in the client 104 is described with reference to FIG. 17. FIG. 17 illustrates an example flowchart of the document move processing.

In step S1701, when a folder icon of a monitor target folder in the repository area 503 is selected by the user operation, the main control unit 315 acquires a list of documents from the document management server 102, and displays the list of the document icons in the document list area 504.

Further, when the user selects a document icon, and drags and drops the document icon to a destination folder UI in the repository area 503, the main control unit 315 requests the document management server 102 to move the document corresponding to the document icon. In response to the request, the document management server 102 executes the move of the document.

In step S1702, the main control unit 315 reads the setting value of the monitor target folder from the storage unit 317, and determines whether the move source folder is specified as a monitor target folder. If the main control unit 315 determines that the move source folder is specified as a monitor target folder (YES in step S1702), the processing proceeds to step S1703. If the main control unit 315 determines that the move source folder is not specified as a monitor target folder (NO in step S1702), the processing ends.

In step S1703, the library determination unit 314 determines whether the library to which the folder corresponding to the folder icon selected by the user operation belongs is provided in the document management server 102 in an external network. The processing is similar to that in step S1004, and accordingly, its detailed description is omitted.

In step S1704, the main control unit 315 instructs the data transmission and reception unit 316 to transmit the operation history information to the data management server 105.

In step S1705, when the control unit 322 in the data management server 105 receives the data transmission request from the client 104, the control unit 322 analyzes the contents of the operation history information, and instructs the data management unit 323 to store the data. The data management unit 323 stores the data in the operation history information management table 1600 in the storage unit 324.

The record 1604 illustrated in FIG. 16A is an example of the data of the operation history information (operation history information XML (not illustrated)) stored in the operation history information management table 1600.

In step S1706, the main control unit 315 in the client 104 instructs the data transmission and reception unit 316 to transmit the move history information to the data management server 105.

In step S1707, when the control unit 322 in the data management server 105 receives the data transmission request from the client 104, the control unit 322 analyzes the contents of the move history information, and instructs the data management unit 323 to store the data. The data management unit 323 stores the data in the move history information management table 1610 in the storage unit 324.

The record 1614 illustrated in FIG. 16B is an example of the data of the move history information (move history information XML (not illustrated)) stored in the move history information management table 1610.

The move processing (an example of the mobile processing) for moving a new document in a monitor target folder in the document management server 102 to a destination folder by the mobile application 331 in the mobile terminal 106 is described with reference to FIG. 18. FIG. 18 illustrates an example flowchart of the mobile processing in the mobile terminal 106.

In the processing, the mobile application 331 in the mobile terminal 106 is started in response to an instruction by the user operation, for example, a click operation of an icon for receiving the instruction for starting the mobile application 331. The processing from step S1801 to S1813 is similar to that from step S1401 to 1413, and accordingly, description of the processing is omitted.

In step S1814, the operation information acquisition unit 333 determines whether the UI for transferring to the screen for operating the document is selected, that is, the document operation selection button 1514 is pressed, by the user operation. If the operation information acquisition unit 333 determines that the UI is pressed (YES in step S1814), the processing proceeds to step S1815. If the operation information acquisition unit 333 determines that the UI is not pressed (NO in step S1814), the processing ends.

If the operation information acquisition unit 333 determines that the UI is pressed, the unit 333 notifies the main control unit 334 that the UI is pressed. The main control unit 334 instructs the data transmission and reception unit 335 to request the list (document operation selection list) of the document operation button to the data management server 105.

In step S1815, the control unit 322 in the data management server 105 specifies the user from the user name contained in the request of the document operation selection list, or the like.

The control unit 322 instructs the data management unit 323 to acquire the operation history information of the Notify_ID associated with the specified user from the operation history information management table 1600. The control unit 322 analyzes the contents of the acquired operation history information, and sorts the information of the document operation buttons in the document operation selection list in the order of the number of times of operation.

In step S1816, the control unit 322 returns the sorted document operation selection list to the mobile terminal 106.

Figure 19A:
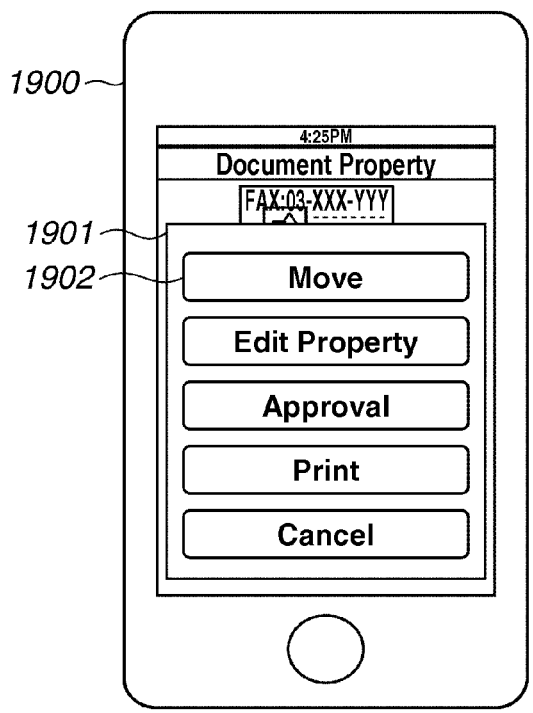
FIGS. 19A, 19B, and 19C illustrate example mobile terminal screens.

In step S1817, the main control unit 334 instructs the information display unit 332 to display a document operation selection screen 1900 illustrated in FIG. 19A based on the document operation selection list acquired from the data management server 105.

FIG. 19A illustrates an example of the mobile terminal screen 400 (document operation selection screen 1900) based on the operation history information. On a document operation selection list 1901, the document operation buttons are listed in an order according to the operation history information.

The document operation selection button 1902 is an example of a UI for transferring to a screen (the destination folder selection screen 1910) for moving a document. When the document move button 1902 is displayed at the top in the list, it means that the move of documents is performed most frequently as the operations of the documents in the monitor target folders in the client 104.

In step S1818, the operation information acquisition unit 333 determines whether the UI for transferring to the screen for moving the document is selected, that is, the document move button 1902 is pressed, by the user operation. If the operation information acquisition unit 333 determines that the UI is pressed (YES in step S1818), the processing proceeds to step S1819. If the operation information acquisition unit 333 determines that the UI is not pressed (NO in step S1818), the processing ends.

If the operation information acquisition unit 333 determines that the UI is pressed, the operation information acquisition unit 333 notifies the main control unit 334 that the UI is pressed. The main control unit 334 instructs the data transmission and reception unit 335 to request the destination folder information to the data management server 105.

In step S1819, the control unit 322 in the data management server 105 specifies the user from the user name contained in the request of the destination folder information, or the like. The control unit 322 instructs the data management unit 323 to acquire the move history information of the Notify_ID associated with the specified user from the move history information management table 1610. The control unit 322 analyzes the contents of the acquired move history information, and sorts the destination folder information in the order of the number of times specified as the destination of the documents.

In step S1820, the control unit 322 returns the sorted destination folder information to the mobile terminal 106. In step S1821, the main control unit 334 instructs the information display unit 332 to display the destination folder selection list screen 1910 illustrated in FIG. 19B.

Figure 19B:
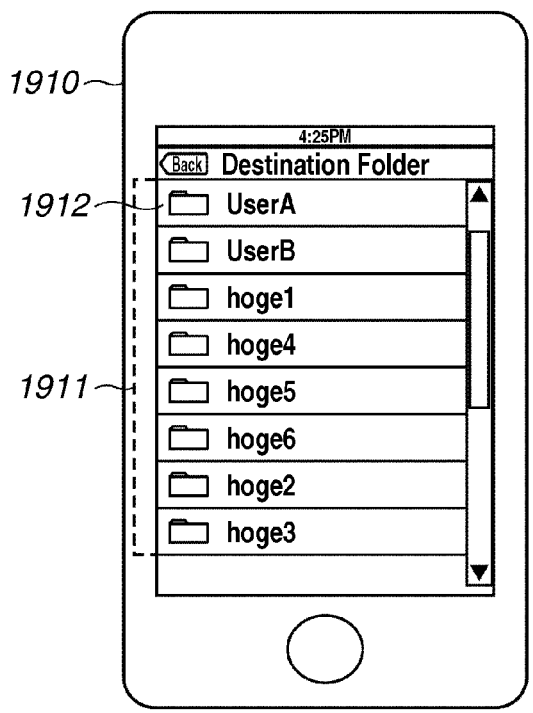

FIG. 19B illustrates an example of the mobile terminal screen 400 (destination folder selection list screen 1910) according to the move history information. The destination folder UI list 1911 displays a list of destination folder UIs in the order according to the move history information. When the destination folder UI 1912 is displayed at the top in the list, it means that the destination folder UI 1912 is a most frequently specified destination folder in the operations for moving the documents in the monitor target folder information in the client 104.

A case where the document operation selection list returned from the data management server 105 does not contain the information of the destination folder UIs is described.

In such a case, for example, the main control unit 334 displays a list of the destination folder UIs using a setting value input (specified) via a destination setting screen (not illustrated) of the mobile application 331 by the user operation and managed in the storage unit 336. Alternatively, for example, when a repository display button (not illustrated) is pressed, the main control unit 334 instructs the information display unit 332 to acquire information of folders in a library from the document management server 102, and to display the information on a library display screen (not illustrated).

When a destination folder UI or a folder icon of a folder specified as the destination in the library is selected by the user operation, the main control unit 334 instructs the data transmission and reception unit 335 to request the document management server 102 to move of the document. In response to the request, the processing in step S1420 is performed.

In step S1822, in response to selection of the UI (destination folder UI 1912) for receiving the move of the document to the destination folder by the user operation, the main control unit 334 receives a notification from the operation information acquisition unit 333. The main control unit 334 instructs the data transmission and reception unit 335 to request the document management server 102 to move the document.

In step S1823, the control unit 302 in the document management server 102 executes the move of the document.

Figure 19C:
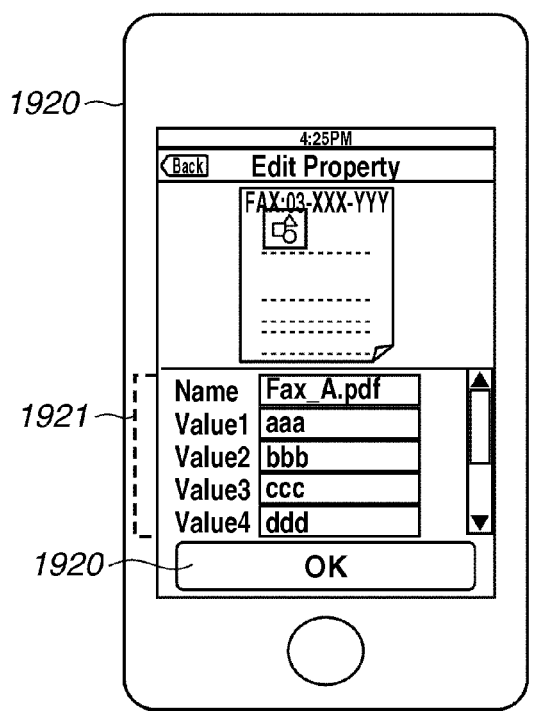

FIG. 19C illustrates an example of the mobile terminal screen 400 (document property edition screen 1920) based on the document property edition history information.

A property history information management table (not illustrated) manages information (property history information) of a history indicating which property of which document out of properties of the documents is edited in edition of the properties of the documents in the client application 311. The property history information management table is provided in the storage unit 324 in the data management server 105.

The configuration allows the user to control the mobile application 331 in the mobile terminal 106 in such a manner that the display order of the properties 1921 is controlled according to the property history information in editing document properties. As a result, the user operability can be increased.

As described above, the UIs can be effectively arranged in the small operation area on the mobile terminal 106 by the display of the UIs such as the document operation buttons by the mobile terminal 106 based on the operation history information to the documents in the client 104. As a result, the user can easily operate the UIs.

Further, the increase in the amount of the data to be managed in the data management server 105 can be prevented by managing only the operation history information to the documents in the monitor target folder.

According to the above-described exemplary embodiments, user interfaces in a mobile terminal can be used more easily.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable storage medium may store a program that causes a mobile terminal to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-148678 filed Jul. 4, 2011, which is hereby incorporated by reference herein in its entirety.

What is claimed is:

1. A mobile terminal comprising:
a new document list unit configured to display a new document list of documents which also is displayed on a client;
a property unit configured to display a property of a document that is selected from the new document list and is located in the client, wherein the property unit includes an operation button;
a destination folder unit configured to display, in response to a pressing operation of the operation button, a destination folder also being displayed on the client, wherein the mobile terminal displays less than all of the setting values also set in the client to prevent loss of operability of the mobile terminal; and a control unit configured to move the selected document to the destination folder in the client in response to the destination folder unit receiving a move instruction.

2. The mobile terminal of claim 1, wherein the mobile terminal displays less than all of the setting values also set in the client by prioritizing setting value input via the mobile terminal.

3. A method in a mobile terminal, the method comprising:

displaying a new document list of documents which also is displayed on a client;

displaying a property of a document that is selected from the new document list and is located in the client and displaying an operation button;

displaying, in response to a pressing operation of the operation button, a destination folder also being displayed on the client, wherein the mobile terminal displays less than all of the setting values also set in the client to prevent loss of operability of the mobile terminal; and moving the selected document to the destination folder in the client in response to receiving a move instruction.

4. The method of claim 3, wherein the mobile terminal displays less than all of the setting values also set in the client by prioritizing setting value input via the mobile terminal.

5. A non-transitory computer-readable storage medium storing a program to cause a mobile terminal to execute a method, the method comprising:

displaying a new document list of documents which also is displayed on a client;

displaying a property of a document that is selected from the new document list and is located in the client and displaying an operation button;

displaying, in response to a pressing operation of the operation button, a destination folder also being displayed on the client, wherein the mobile terminal displays less than all of the setting values also set in the client to prevent loss of operability of the mobile terminal; and moving the selected document to the destination folder in the client in response to receiving a move instruction.

6. The non-transitory computer-readable storage medium of claim 5, wherein the mobile terminal displays less than all of the setting values also set in the client by prioritizing setting value input via the mobile terminal.

* * * * *